US012098886B2

(12) United States Patent
Prabhu et al.

(10) Patent No.: US 12,098,886 B2
(45) Date of Patent: Sep. 24, 2024

(54) ELECTRIC INDUCTION FURNACE WITH LINING WEAR DETECTION SYSTEM

(71) Applicant: Inductotherm Corp., Rancocas, NJ (US)

(72) Inventors: Satyen N. Prabhu, Voorhees, NJ (US); Thomas W. Shorter, Hainesport, NJ (US); Ted Haines, Westampton, NJ (US); Edward J. Bell, Medford, NJ (US)

(73) Assignee: Inductotherm Corp., Rancocas, NJ (US)

( * ) Notice: Subject to any disclaimer, the term of this patent is extended or adjusted under 35 U.S.C. 154(b) by 469 days.

(21) Appl. No.: 16/787,267

(22) Filed: Feb. 11, 2020

(65) Prior Publication Data

US 2020/0191486 A1 Jun. 18, 2020

Related U.S. Application Data

(60) Division of application No. 15/218,787, filed on Jul. 25, 2016, now Pat. No. 10,598,439, which is a (Continued)

(51) Int. Cl.

| | |
|---|---|
| ***H05B 6/02*** | (2006.01) |
| ***F27B 14/06*** | (2006.01) |
| ***F27B 14/20*** | (2006.01) |
| ***F27D 11/06*** | (2006.01) |
| ***F27D 21/00*** | (2006.01) |
| ***H05B 6/06*** | (2006.01) |

(Continued)

(52) U.S. Cl.
CPC ........ *F27D 21/0021* (2013.01); *F27B 14/061* (2013.01); *F27B 14/20* (2013.01); *F27D 11/06* (2013.01); *H05B 6/067* (2013.01); *H05B 6/24* (2013.01); *H05B 6/28* (2013.01); *H05B 6/367* (2013.01); *Y10T 29/49117* (2015.01)

(58) Field of Classification Search
CPC ............................ F27B 14/20; F27D 21/0021
See application file for complete search history.

(56) References Cited

U.S. PATENT DOCUMENTS 1,922,029 A * 8/1933 Chesnut .................... F27B 3/08 373/145
3,401,227 A * 9/1968 Dunlevy ................. F27B 14/10 373/155

(Continued)

OTHER PUBLICATIONS

Chinafirebrick, retrieved from www.chinafirebrick.com/23Coil-grout.html on May 4, 2022 (via Wayback mach (Year: 2015).*

*Primary Examiner* — Helena Kosanovic
*Assistant Examiner* — Lawrence H Samuels
(74) *Attorney, Agent, or Firm* — Philip O. Post; Robert J. Everling

(57) ABSTRACT

An electric induction furnace for heating and melting electrically conductive materials is provided with a lining wear detection system that can detect replaceable furnace lining wear when the furnace is properly operated and maintained. In some embodiments of the invention the lining wear detection system utilizes an electrically conductive wire assemblage embedded in a wire assemblage refractory disposed between the replaceable lining and the furnace's induction coil.

20 Claims, 29 Drawing Sheets

Related U.S. Application Data continuation-in-part of application No. 13/478,690, filed on May 23, 2012, now Pat. No. 9,400,137.

(60) Provisional application No. 61/497,787, filed on Jun. 16, 2011, provisional application No. 61/488,866, filed on May 23, 2011.

(51) Int. Cl.
*H05B 6/24* (2006.01)
*H05B 6/28* (2006.01)
*H05B 6/36* (2006.01)

(56) References Cited

U.S. PATENT DOCUMENTS 3,916,047 A * 10/1975 Niesen ..................... F27B 3/12 266/286
4,205,197 A * 5/1980 Omori ..................... F27D 11/12 373/145
4,525,665 A * 6/1985 Smalley ..................... H05B 6/28 324/726
4,675,879 A * 6/1987 Meredith ..................... H05B 6/24 373/155
5,416,795 A * 5/1995 Kaniuk ..................... H05B 6/24 264/618
5,479,437 A * 12/1995 Hayashi ..................... F27B 14/08 373/145
5,781,581 A * 7/1998 Fishman ..................... H05B 6/36 335/216
6,148,018 A * 11/2000 Garcia ..................... H05B 6/28 373/145
2001/0002200 A1* 5/2001 Stanley ..................... H05B 6/24 373/153
2004/0114663 A1* 6/2004 Mueller ..................... G01N 27/205 374/139
2011/0231125 A1* 9/2011 Rolet ..................... G01B 7/18 702/64

* cited by examiner

ELECTRIC INDUCTION FURNACE WITH LINING WEAR DETECTION SYSTEM

CROSS REFERENCE TO RELATED APPLICATIONS

This application is a divisional of U.S. application Ser. No. 15/218,787 filed Jul. 25, 2016, which is a continuation-in-part of U.S. application Ser. No. 13/478,690 filed May 23, 2012, now U.S. Pat. No. 9,400,137, which application claims the benefit of U.S. Provisional Application No. 61/488,866 filed May 23, 2011 and U.S. Provisional Application No. 61/497,787 filed Jun. 16, 2011, all of which applications and patents are hereby incorporated by reference in their entireties.

FIELD OF THE INVENTION

The present invention relates to electric induction furnaces, and in particular, to detecting the wear of furnace linings in induction furnaces.

BACKGROUND OF THE INVENTION

FIG. 1 illustrates components of a typical electric induction furnace relevant to a replaceable refractory lining used in the furnace. Replaceable lining 12 (shown stippled in the figure) consists of a material with a high melting point that is used to line the inside walls of the furnace and form interior furnace volume 14. A metal or other electrically conductive material is placed within volume 14 and is heated and melted by electric induction. Induction coil 16 surrounds at least a portion of the exterior height of the furnace and an alternating current flowing through the coil creates a magnetic flux that couples with the material placed in volume 14 to inductively heat and melt the material. Furnace foundation 18 is formed from a suitable material such as refractory bricks or cast blocks. Coil 16 can be embedded in a trowelable refractory (grout) material 20 that serves as thermal insulation and protective material for the coil. A typical furnace ground leak detector system includes probe wires 22*a* protruding into melt volume 14 through the bottom of lining 12 as illustrated by wire end 22*a'* protruding into the melt volume. Wires 22*a* are connected to electrical ground lead 22*b*, which is connected to a furnace electrical ground (GND). Wires 22*a*, or other arrangements used in a furnace ground leak detector system may be generally referred to herein as a ground probe.

As the furnace is used for repeated melts within volume 14, lining 12 is gradually consumed. Lining 12 is replenished in a furnace relining process after a point in the service life of the furnace. Although it is contrary to safe furnace operation and disregards the recommendation of the refractory manufacturer and installer, an operator of the furnace may independently decide to delay relining until refractory lining 12 between the molten metal inside furnace volume 14 and coil 16 has deteriorated to the state that furnace coil 16 is damaged and requires repair, and/or foundation 18 has been damaged and requires repair. In such event, the furnace relining process becomes extensive.

U.S. Pat. No. 7,090,801 discloses a monitoring device for melting furnaces that includes a closed circuit consisting of several conductor sections with at least a partially conducting surface and a measuring/displaying device. A comb-shaped first conductor section is series connected through an ohmic resistor R to a second conductor section. The comb-shaped first conductor section is mounted on the refractory lining and arranged directly adjacent, however, electrically isolated from the second conductor section.

U.S. Pat. No. 6,148,018 discloses an induction melting furnace that includes a detection system for sensing metal penetration into a wall of the furnace depending upon detecting heat flow from the hearth to the furnace. An electrode system is interposed between the induction coil and a slip plane material that serves as a backing to the refractory lining. The electrode system comprises a sensing mat housing conductors receiving a test signal from the power supply, wherein the sensing mat includes a temperature sensitive binder that varies conductivity between the conductors in response to heat penetration through the lining.

U.S. Pat. No. 5,319,671 discloses a device that has electrodes arranged on the furnace lining. The electrodes are divided into two groups of different polarity and are spaced apart from each other. The electrode groups can be connected to a device that determines the electrical temperature-dependent resistance of the furnace lining. At least one of the electrodes is arranged as an electrode network on a first side on a ceramic foil. Either the first side of the ceramic foil or the opposite side is arranged on the furnace lining. The foil in the former case has a lower thermal conductivity and a lower electrical conductivity than the ceramic material of the furnace lining, and in the latter case an approximately identical or higher thermal conductivity and an approximately identical or higher electrical conductivity.

U.S. Pat. No. 1,922,029 discloses a shield that is inserted in the furnace lining to form one contact of a control circuit. The shield is made of sheet metal and is bent to form a cylinder. When metal leaks out from the interior of furnace it makes contact with the shield, and the signal circuit is closed.

U.S. Pat. No. 1,823,873 discloses a ground shield that is located within the furnace lining and spaced apart from the induction coil. An upper metallic conduit of substantially open annular shape is provided, as is also a similar lower metal conduit also of open annular shape. A plurality of relatively smaller metallic pipes or conduits extend between the two larger conduits and are secured thereto in a fluid-tight manner. A ground is provided which is connected to the protecting shield.

One object of the present invention is to provide an electric induction furnace with a lining wear detection system that can assist in avoiding furnace coil damage and/or bottom foundation damage due to lining wear when the furnace is properly operated and maintained.

BRIEF SUMMARY OF THE INVENTION

In one aspect, the present invention is an apparatus for, and method of providing a lining wear detection system for an electric induction furnace.

In another aspect the present invention is an electric induction furnace with a lining wear detection system. A replaceable furnace lining has an inner boundary surface and an outer boundary surface, with the inner boundary surface forming the interior volume of the electric induction furnace in which electrically conductive material can be deposited for induction heating and melting. At least one induction coil surrounds the exterior height of the replaceable lining. A furnace ground circuit has a first end at a ground probe, or probes, protruding into the interior volume of the electric induction furnace and a second end at an electrical ground connection external to the electric induction furnace. At least one electrically conductive wire assemblage is embedded in a refractory disposed between the outer boundary surface of the wall of the replaceable lining and the induction coil. Each electrically conductive wire assemblage forms an electrically discontinuous boundary between the refractory in which it is embedded and the replaceable lining. A direct current voltage source has a positive electric potential connected to the electrically conductive wire assemblage, and a negative electric potential connected to the electrical ground connection. A lining wear detection circuit is formed from the positive electric potential connected to the electrically conductive wire assemblage to the negative electric potential connected to the electrical ground connection so that the level of DC leakage current in the lining wear detection circuit changes as the wall of the replaceable lining is consumed. A detector can be connected to each one of the lining wear detection circuits for each electrically conductive wire assemblage to detect the change in the level of DC leakage current, or alternatively a single detector can be switchably connected to multiple lining wear detection circuits.

In another aspect the present invention is a method of fabricating an electric induction furnace with a lining wear detection system. A wound induction coil is located above a foundation and a refractory can be installed around the wound induction coil to form a refractory embedded induction coil. A flowable refractory mold is positioned within the wound induction coil to provide a cast flowable refractory volume between the outer wall of the flowable refractory mold and the inner wall of the refractory embedded induction coil. At least one electrically conductive wire assemblage is fitted around the outer wall of the flowable refractory mold. A wire assemblage refractory is placed into the refractory volume to embed the at least one electrically conductive wire assemblage in the cast flowable refractory to form an embedded wire assemblage refractory. The refractory mold is removed, and a replaceable lining mold is positioned within the volume of the embedded wire assemblage refractory to establish a replaceable lining wall volume between the outer wall of the replaceable lining mold and the inner wall of the embedded wire assemblage refractory, and a replaceable lining bottom volume above the foundation. A replaceable lining refractory is fed into the replaceable lining wall volume and the replaceable lining bottom volume, and the replaceable lining mold is removed.

In another aspect, the invention is an electric induction heating or melting furnace with a lining wear detection system that can detect furnace lining wear when the furnace is properly operated and maintained.

These and other aspects of the invention are set forth in the specification and the appended claims.

BRIEF DESCRIPTION OF THE DRAWINGS

The figures, in conjunction with the specification and claims, illustrate one or more non-limiting modes of practicing the invention. The invention is not limited to the illustrated layout and content of the drawings.

FIG. 3(*b*) illustrates in top plan view the electrically conductive mesh shown in FIG. 3(*a*) in the shape as installed around the circumference of the electric induction furnace shown in FIG. 2.

FIG. 11(*b*) illustrates in top plan view the electrically conductive wire assemblage shown in FIG. 11(*a*) embedded in the wire assemblage refractory in the shape as installed around the circumference of the electric induction furnace shown in FIG. 10.

FIG. 12(*b*) illustrates in top plan view one example of a fixture that is used to install the electrically conductive wire assemblage shown in FIG. 12(*a*) around the top circumference of the electric induction furnace shown in FIG. 10.

FIG. 12(*c*) illustrates in partial elevation view one example of the fixture shown in FIG. 12(*b*).

FIG. 12(*d*) illustrates in partial elevation view one example of weaving a continuous electrically conductive wire assemblage around the fixture shown in FIG. 12(*b*).

FIG. 12(*e*) illustrates in top plan view one example of a fixture that is used to install the electrically conductive wire assemblage shown in FIG. 12(*a*) around the bottom circumference of the electric induction furnace shown in FIG. 10.

DETAILED DESCRIPTION OF THE INVENTION

Figure 1:
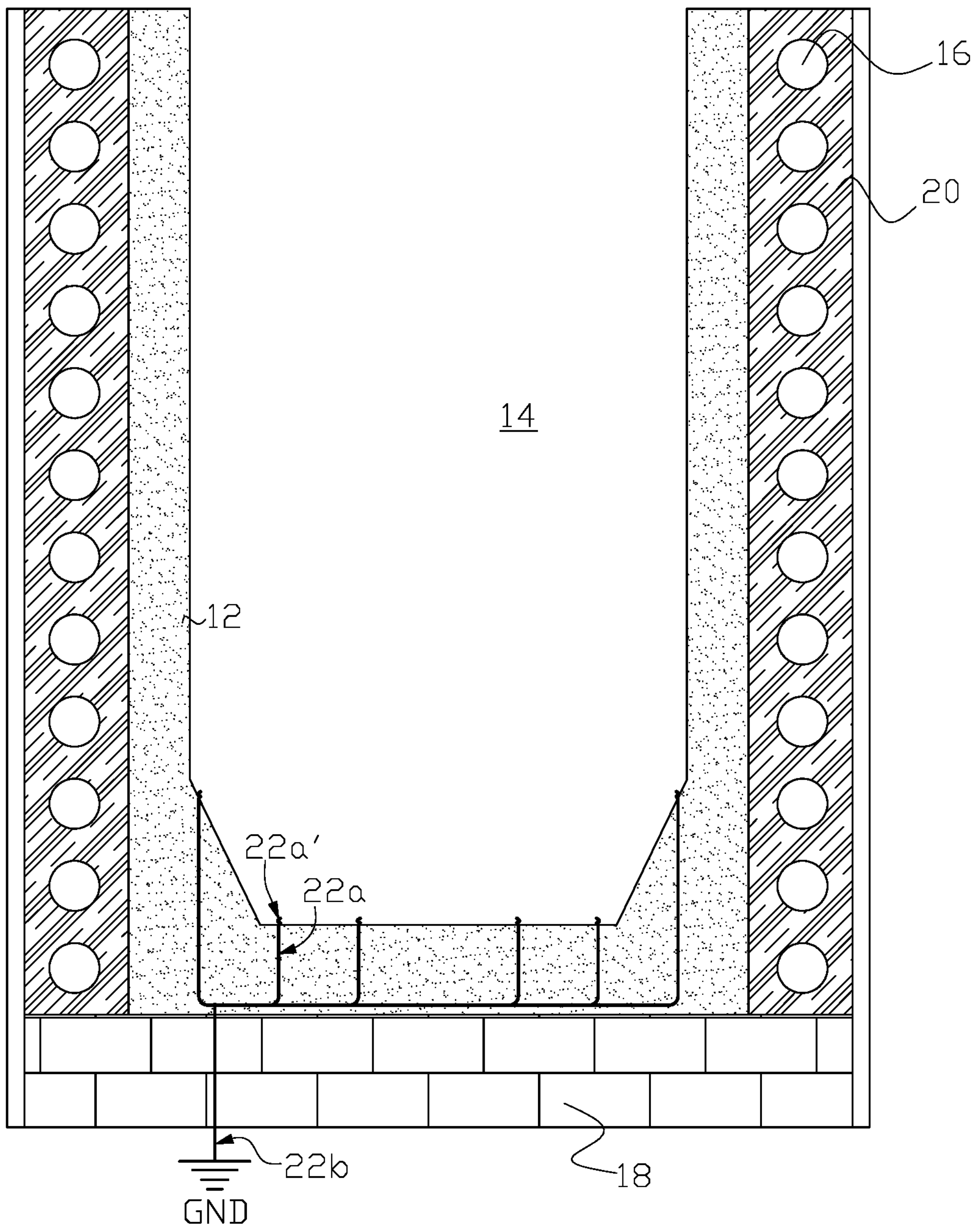
FIG. 1 is a simplified cross sectional diagram of one example of an electric induction furnace.
Figure 2:
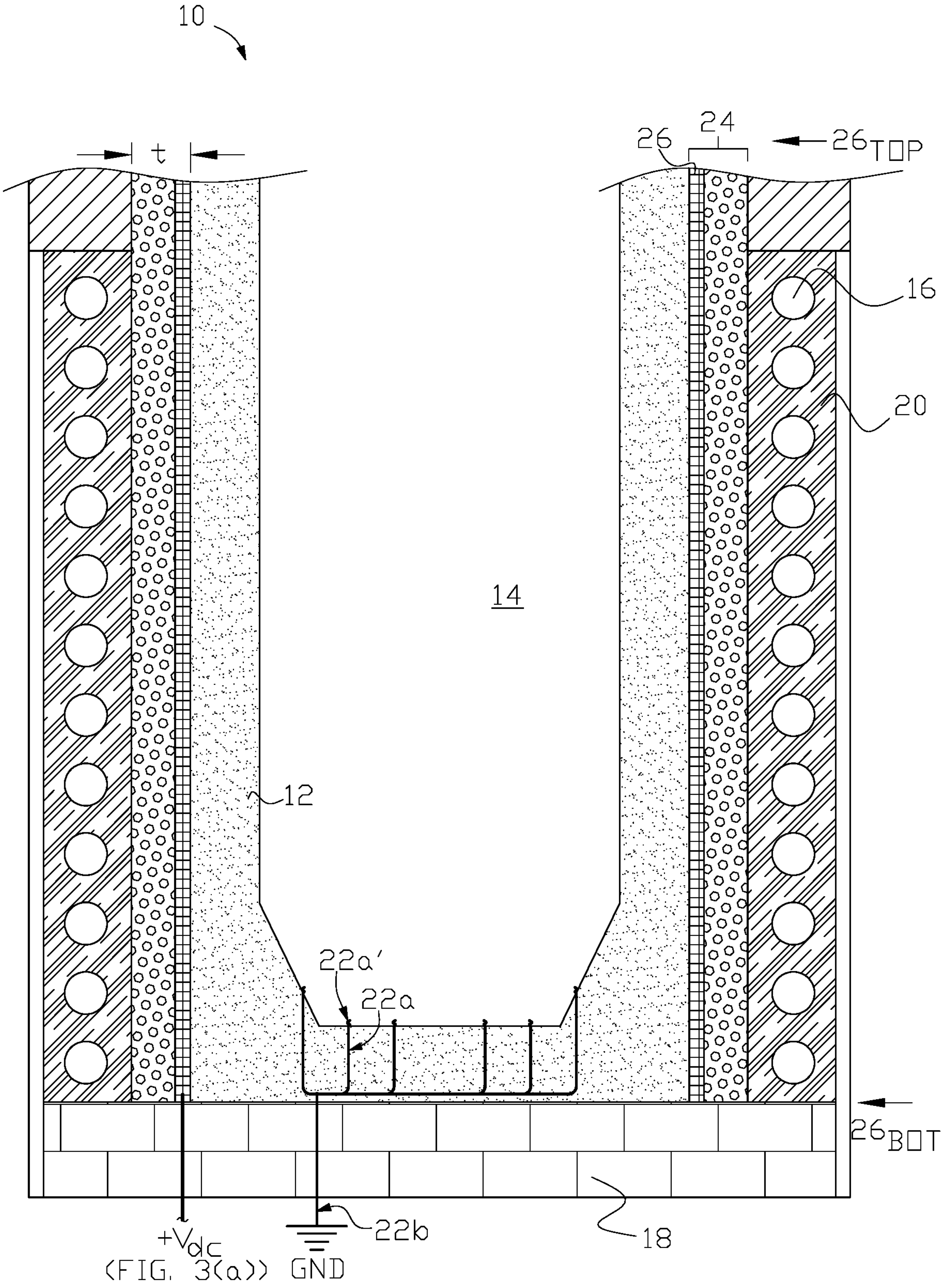
FIG. 2 is a cross sectional diagram of one example of an electric induction furnace with a lining wear detection system of the present invention.
Figure 3A:
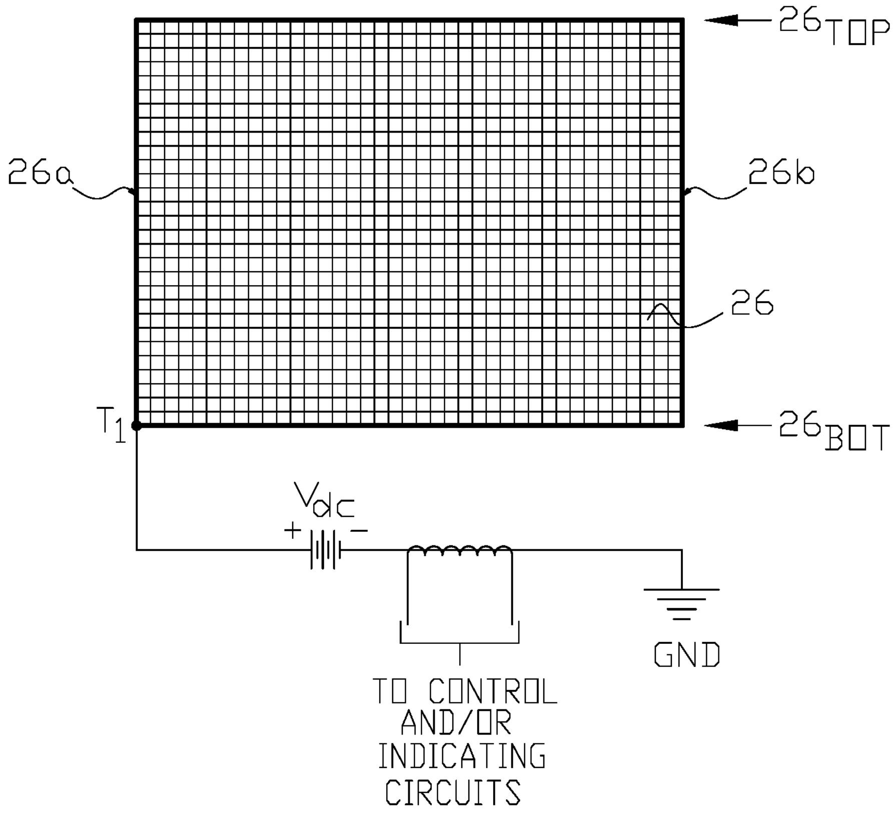
FIG. 3(*a*) illustrates in flat planar view one example of an electrically conductive mesh, a lining wear detection circuit, and a control and/or indicating (detector) circuit used in the electric induction furnace shown in FIG. 2
Figure 3B:
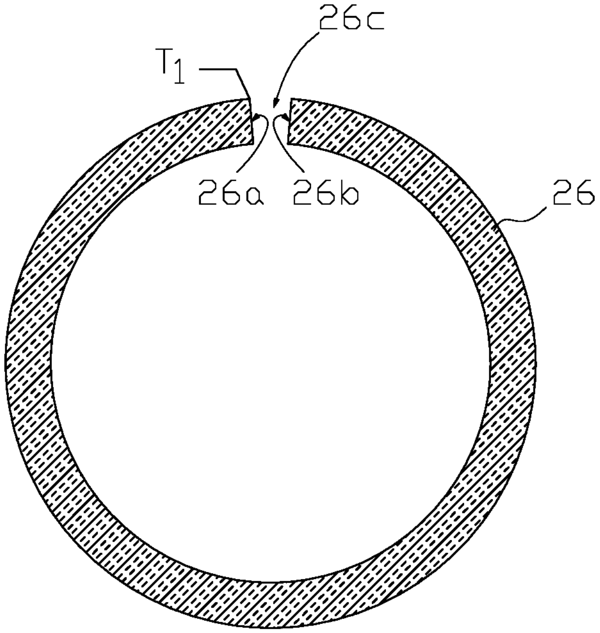

There is shown in FIG. 2 one example of an electric induction furnace 10 with a lining wear detection system of the present invention. A cast flowable refractory 24 is disposed between coil 16 and replaceable furnace lining 12. In this example of the invention, electrically conductive mesh 26, (for example, a stainless steel mesh) is embedded within the inner boundary of castable refractory 24 that is adjacent to the outer boundary of lining 12. One non-limiting example of a suitable mesh is formed from type 304 stainless steel welded wire cloth with mesh size 4×4; wire diameter between 0.028-0.032-inch; and opening width of 0.222-0.218-inch. As shown in FIGS. 3(*a*) and 3(*b*), for this example of the invention, mesh 26 forms a discontinuous cylindrical mesh boundary between castable refractory 24 and lining 12 from the top ($\mathbf{26}_{TOP}$) to the bottom ($\mathbf{26}_{BOT}$) of the outer boundary of the lining wall. One vertical side 26*a* of mesh 26 is suitably connected to a positive electric potential that can be established by a suitable voltage source, such as direct current (DC) voltage source $V_{dc}$ that has its other terminal connected to furnace electrical ground (GND). A lining wear detection circuit is formed between the positive electric potential connected to the electrically conductive mesh and the negative electric potential connected to the furnace electrical ground. Vertical discontinuity 26*c* (along the height of the lining in this example) in mesh 26 is sized to prevent short circuiting between opposing vertical sides 26*a* and 26*b* of mesh 26. Alternatively the mesh may be fabricated in a manner so that the mesh is electrically isolated from itself; for example, a layer of electrical insulation can be provided between two overlapping ends (sides 26*a* and 26*b* in this example) of the mesh. As shown in FIG. 3(*a*) the voltage source circuit can be connected to control and/or indicating circuits via suitable circuit elements such as a current transformer. The control and/or indicating circuits are referred to collectively as a detector. As lining 12 is gradually consumed during the service life of the furnace, DC leakage current will rise, which can be sensed in the control/indicating circuits. For a particular furnace design, a leakage current rise level set point can be established for indication of lining replacement when the furnace is properly operated and maintained.

Figure 4:
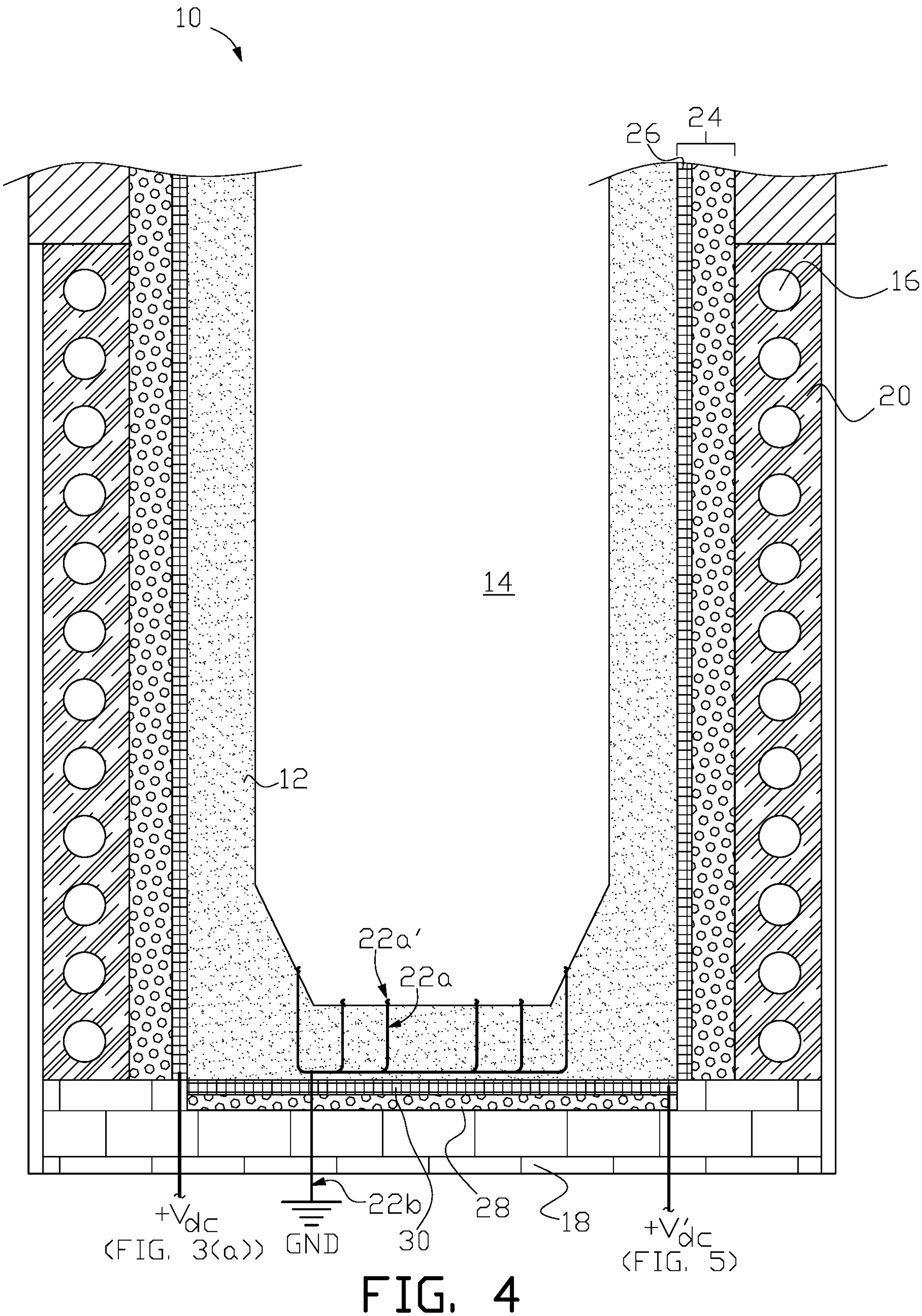
FIG. 4 is a cross sectional diagram of another example of an electric induction furnace with a lining wear detection system of the present invention that includes a bottom electrically conductive mesh.
Figure 5A:
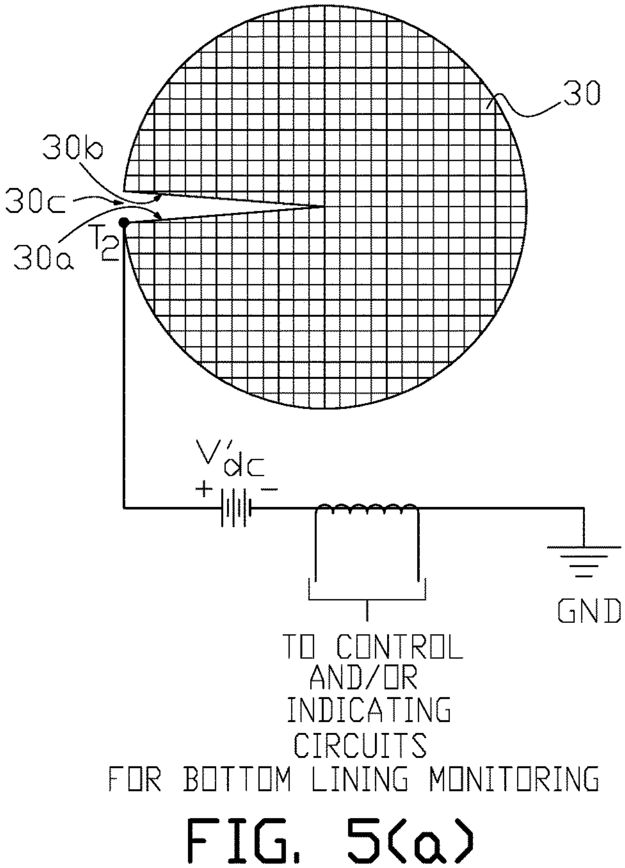
FIGS. 5(*a*) and 5(*b*) illustrate in top plan view alternative bottom electrically conductive mesh, bottom lining wear detection circuit, and control and/or indicating (detector) circuit used for bottom lining wear detection in one example of the present invention.
Figure 5B:
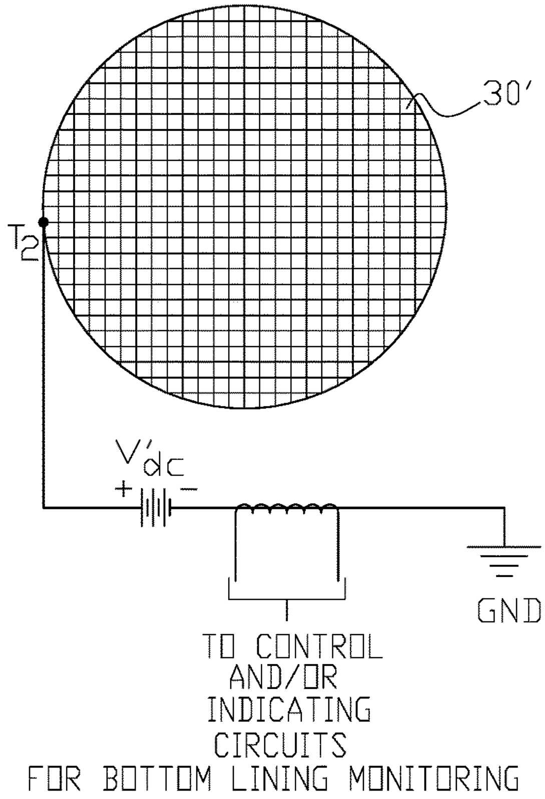

In some examples of the invention, a bottom lining wear detection system may be provided as shown, for example in FIG. 4, in addition to the wall lining wear detection system shown in FIG. 2. In FIG. 4 electrically conductive bottom mesh 30 is disposed within cast flowable refractory 28 with bottom mesh 30 adjacent to the lower boundary of lining 12 at the bottom of the furnace. As shown in FIG. 5(*a*) in this example of the invention, bottom mesh 30 forms a discontinuous circular mesh boundary between bottom cast flowable refractory 28 and the bottom of lining 12. In other examples of the invention, the bottom mesh boundary may be formed from a continuous circular mesh 30' as shown in FIG. 5(*b*) between bottom cast flowable refractory 28 and the bottom of lining 12. In the discontinuous examples, discontinuous radial side 30*a* of bottom mesh 30 is suitably connected to a positive electric potential established by a suitable voltage source $V'_{dc}$ that has its other terminal connected to furnace electrical ground (GND). A bottom lining wear detection circuit is formed between the positive electric potential connected to the electrically conductive bottom mesh and the negative electric potential connected to the furnace electrical ground. If use, radial discontinuity 30*c* in mesh 30 is sized to prevent short circuiting between opposing radial sides 30*a* and 30*b* of mesh 30. Alternatively the mesh may be fabricated in a manner so that the mesh is electrically isolated from itself; for example, a layer of electrical insulation can be provided between two overlapping ends (radial sides 30*a* and 30*b* in this example) of the mesh. As shown in FIG. 5(*a*), the bottom lining wear detection circuit can be connected to a bottom lining wear control and/or indicating circuits, which are collectively referred to as a detector. As the bottom of lining 12 is gradually consumed during the service life of the furnace, DC leakage current will rise, which can be sensed in the bottom lining wear control and/or indicating circuits. For a particular furnace design, a leakage current rise level set point can be established for indication of lining replacement, based on bottom lining wear, when the furnace is properly operated and maintained.

The particular arrangements of the discontinuous side wall and bottom meshes shown in the figures are one example of discontinuous mesh arrangements of the present invention. The purpose for the discontinuity is to prevent eddy current heating of the mesh from inductive coupling with the magnetic flux generated when alternating current is flowing through induction coil 16 when the coil is connected to a suitable alternating current power source during operation of the furnace. Therefore other arrangements of side wall and bottom meshes are within the scope of the invention as long as the mesh arrangement prevents such inductive heating of the mesh. Similarly arrangement of the electrical connection(s) of the mesh to the lining wear detection circuit, and the control and/or indicating circuits can vary depending upon a particular furnace design. Depending upon the physical arrangement of a particular electric induction furnace continuous bottom and/or side wall meshes may be satisfactory without excessive eddy current heating.

Figure 8:
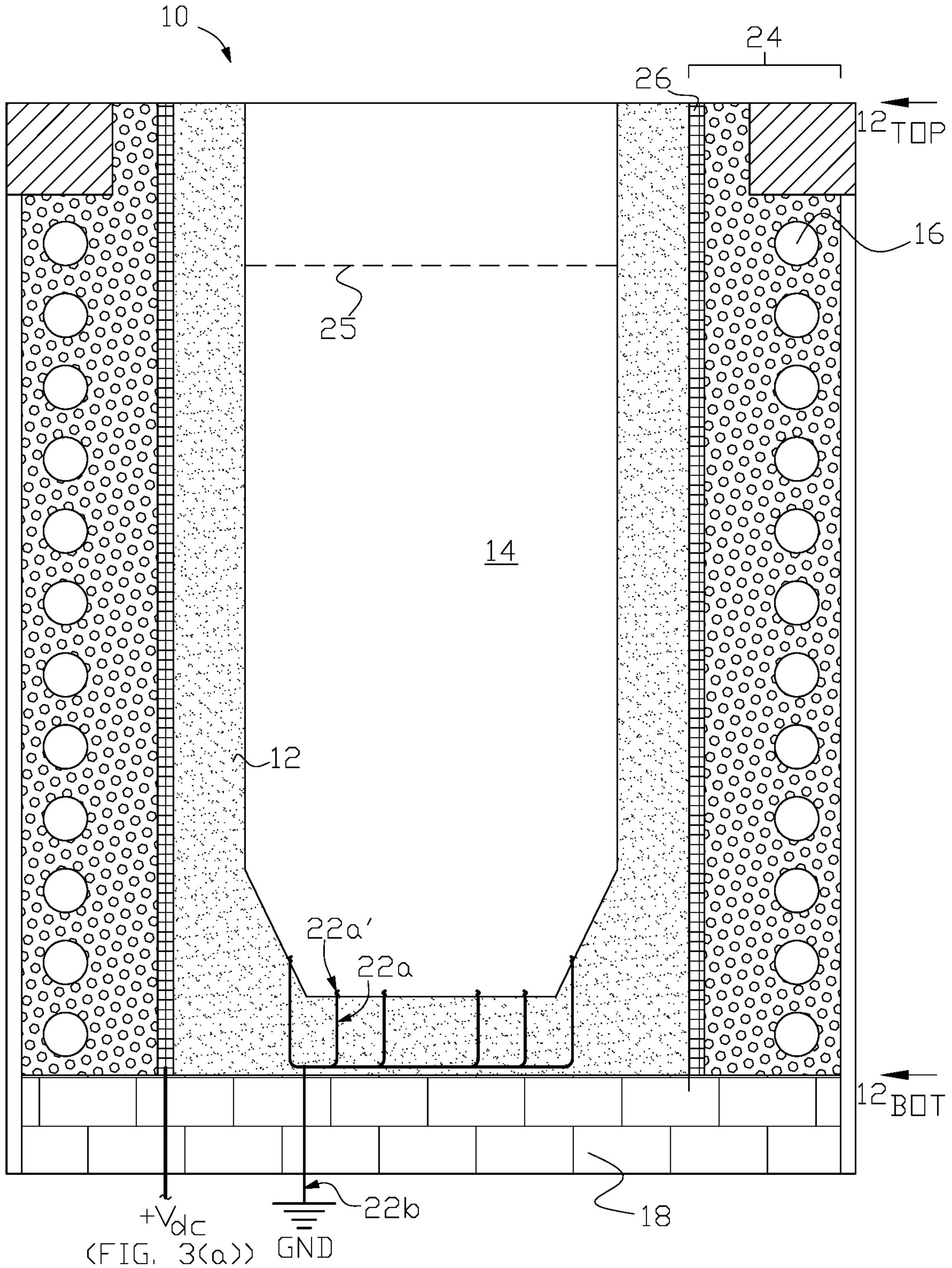
FIG. 8 is a cross sectional diagram of another example of an electric induction furnace with a lining wear detection system of the present invention.
Figure 9C:
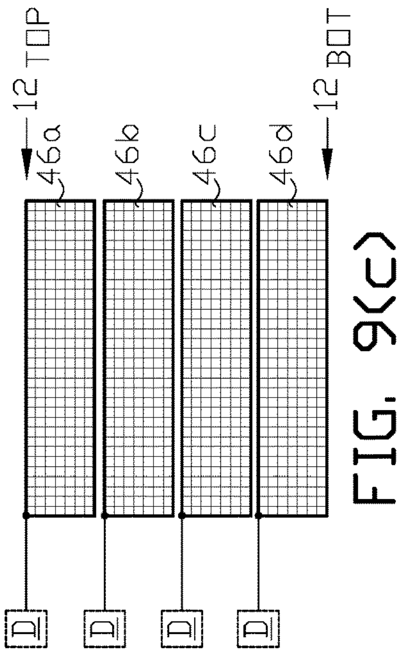
FIG. 9(*a*) through FIG. 9(*d*) illustrate alternative arrangements of electrically conductive mesh, lining wear detection circuits and detectors used in the electric induction furnace with a lining wear detection system of the present invention.
Figure 9D:
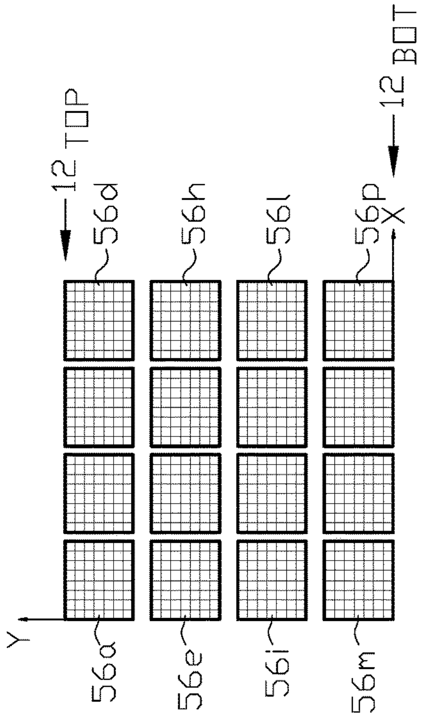
Figure 9A:
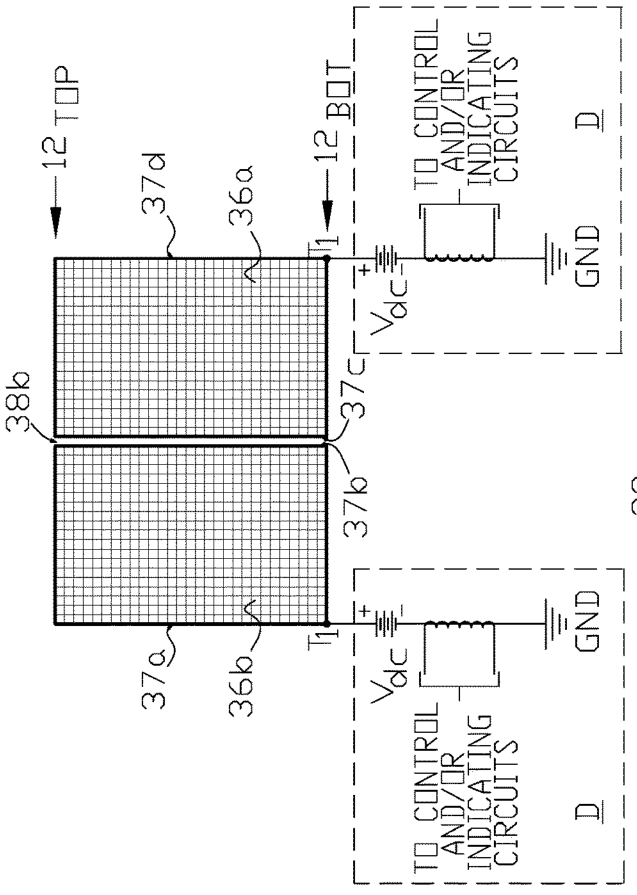
Figure 9B:
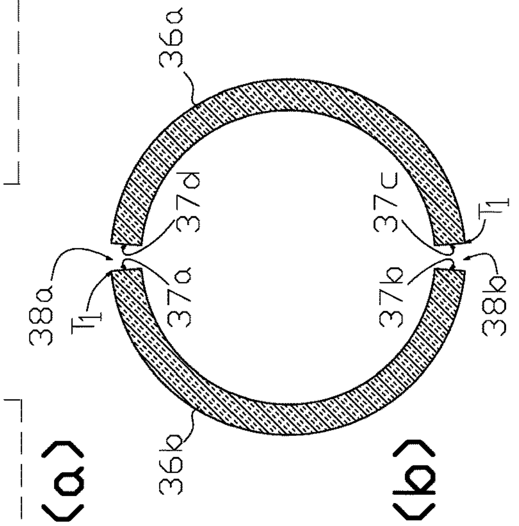

In some examples of the invention refractory embedded wall mesh 26 may extend for the entire vertical height of lining 12, that is, from the bottom ($\mathbf{12}_{BOT}$) of the furnace lining to the very top ($\mathbf{12}_{TOP}$) of the furnace lining that is above the nominal design melt line 25 for a particular furnace as shown, for example, in FIG. 8.

In other applications, wall mesh 26 may be provided in one or more selected discrete regions along the vertical height of lining 12. For example in FIG. 9(*a*) and FIG. 9(*b*)

wall mesh comprises two vertical electrically conductive meshes 36*a* and 36*b* that are electrically isolated from each other and connected to separate lining wear detection circuits so that lining wear can be diagnosed as being on either one half side of the furnace lining. In this example there are two electrical discontinuities 38*a* (formed between vertical sides 37*a* and 37*d*) and 38*b* (formed between vertical sides 37*b* and 37*c*) along the vertical height of the two meshes 36*a* and 36*b*. Further any multiple of separate, vertically oriented and electrically isolated wall mesh regions may be provided along the vertical height of lining 12 with each separate wall mesh region being connected to a separate lining wear detection circuit so that lining wear could be localized to one of the wall mesh regions. Alternatively as shown in FIG. 9(*c*) the multiple electrically conductive meshes 46*a* through 46*d* can be horizontally oriented with each electrically isolated mesh connected to a separate lining wear detection circuit and control and/or indicating circuits (D) so that lining wear can be localized to one of the isolated mesh regions. Most generally as shown in FIG. 9(*d*) the multiple electrically conductive meshes 56*a* through 56*p* can be arrayed around the height of the replaceable lining wall with each electrically conductive mesh connected to a separate lining wear detection circuit, and control and/or indicating circuits (not shown in the figure) so that lining wear can be localized to one of the isolated mesh regions that can be defined by a two-dimensional X-Y coordinate system around the circumference of the replaceable lining wall with the X coordinate defining a position around the circumference of the lining and the Y coordinate defining a position along the height of the lining.

In similar fashion bottom mesh 30 may cover less than the entire bottom of replaceable lining 12 in some examples of the invention, or comprise a number of electrically isolated bottom meshes with each of the electrically isolated bottom meshes connected to a separate lining wear detection circuit so that lining wear could be localized to one of the bottom mesh regions.

Alternatively to a separate detector (control and/or indicating circuits) used with each lining wear detection circuit in the above examples, a single detector can be switchably connected to the lining wear detection circuits associated with two or more of the electrically isolated meshes in all examples of the invention.

While the figures illustrate separate wall and bottom lining wear detection systems, in some examples of the invention, a combined wall and bottom lining wear detection system may be provided either by (1) providing a continuous side and bottom mesh embedded in an integrally cast flowable refractory with a single lining wear detection circuit and detector or (2) providing separate side and bottom meshes embedded in a cast flowable refractory with a common lining wear detection circuit and detector.

FIG. 6(*a*) through FIG. 6(*f*) illustrate one example of fabrication of an electric induction furnace with a lining wear detection system of the present invention. Induction coil 16 can be fabricated (typically wound) and positioned over suitable foundation 18. As shown in FIG. 6(*a*) trowelable refractory (grout) material 20 can be installed around the coil as in the prior art. One suitable proprietary trowelable refractory material 20 is INDUCTOCOAT™ 35AF (available from Inductotherm Corp., Rancocas, New Jersey). If a bottom lining wear detection system is used, bottom mesh 30 can be fitted at the top of foundation 18 and embedded in cast flowable refractory by pouring the cast flowable refractory around bottom mesh 30 so that the mesh is embedded within the refractory after it sets as shown in FIG. 6(*b*). Alternatively the bottom mesh can be cast in a cast flowable refractory 28 in a separate mold and then the cast refractory embedded bottom mesh can be installed in the bottom of the furnace after the cast flowable refractory sets.

Figure 7:
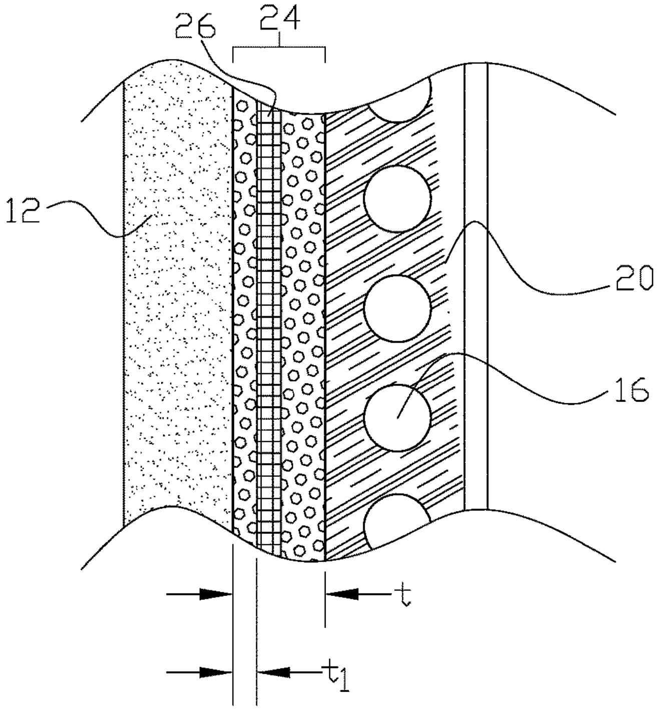
FIG. 7 is a detail of one example of the electrically conductive mesh embedded in a cast flowable refractory used in an electric induction furnace with a lining wear detection system of the present invention.
Figure 6A:
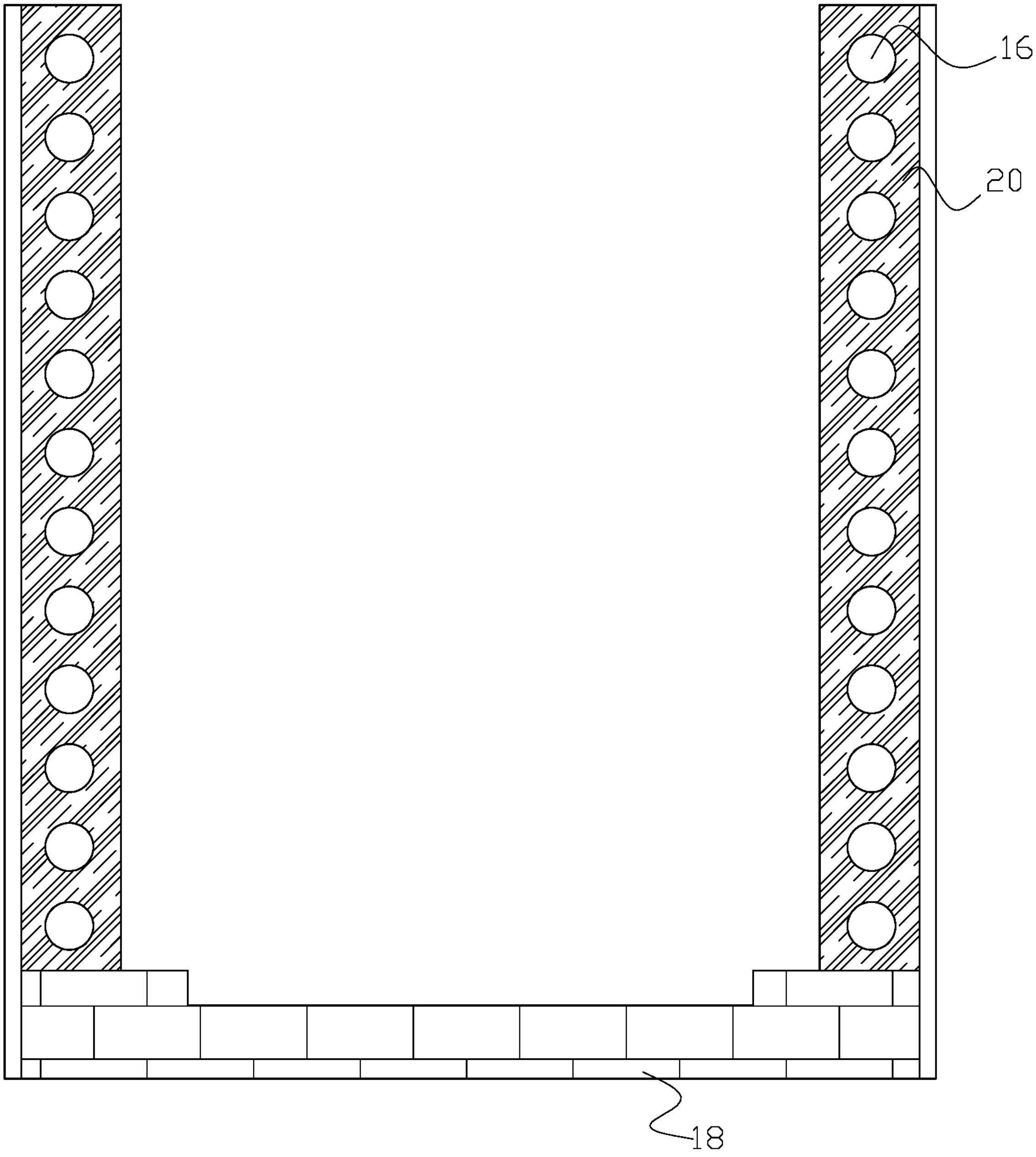
FIG. 6(*a*) through FIG. 6(*g*) illustrate fabrication of one example of an electric induction furnace with a lining wear detection system of the present invention.
Figure 6B:
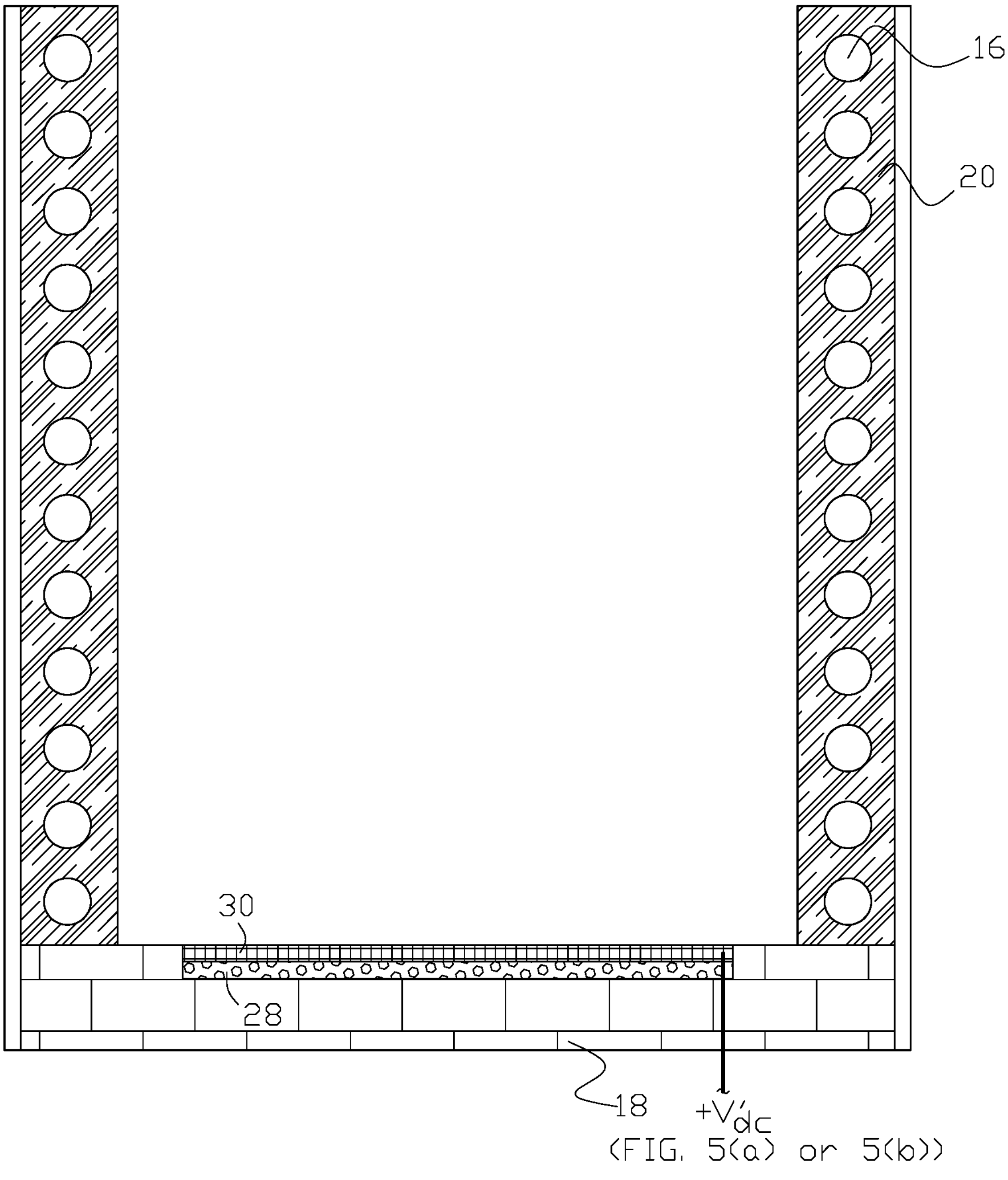
Figure 6C:
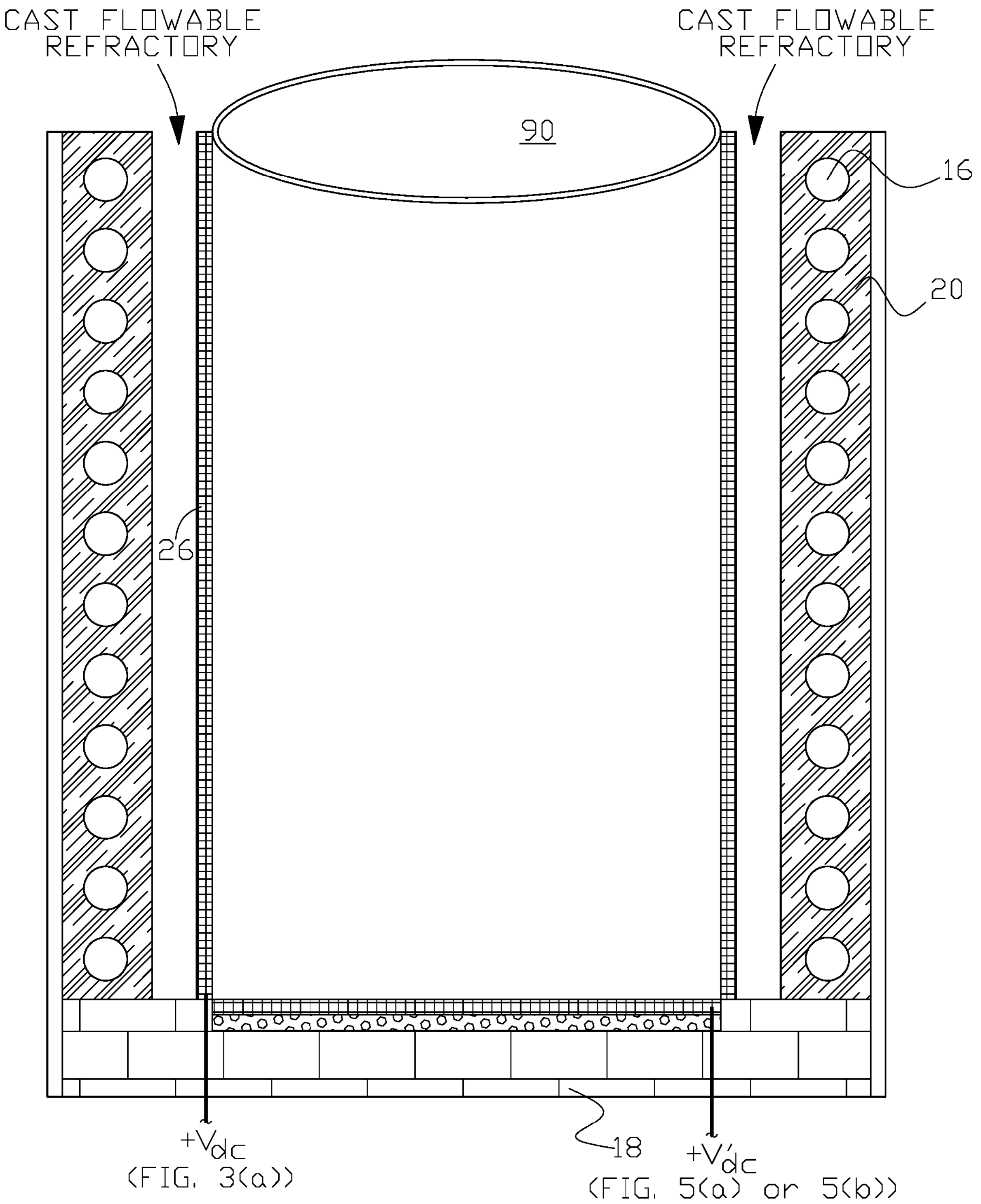
Figure 6D:
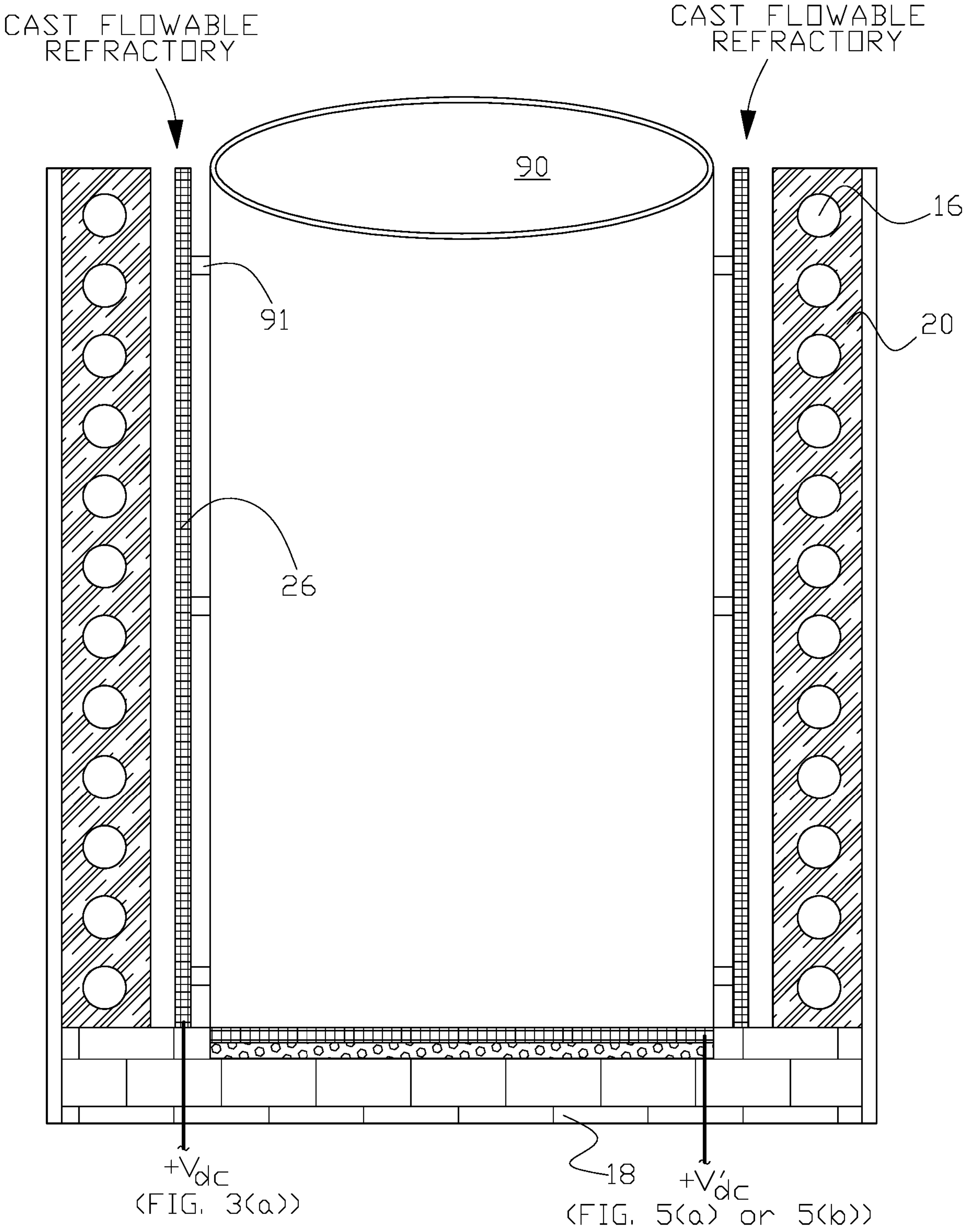
Figure 6E:
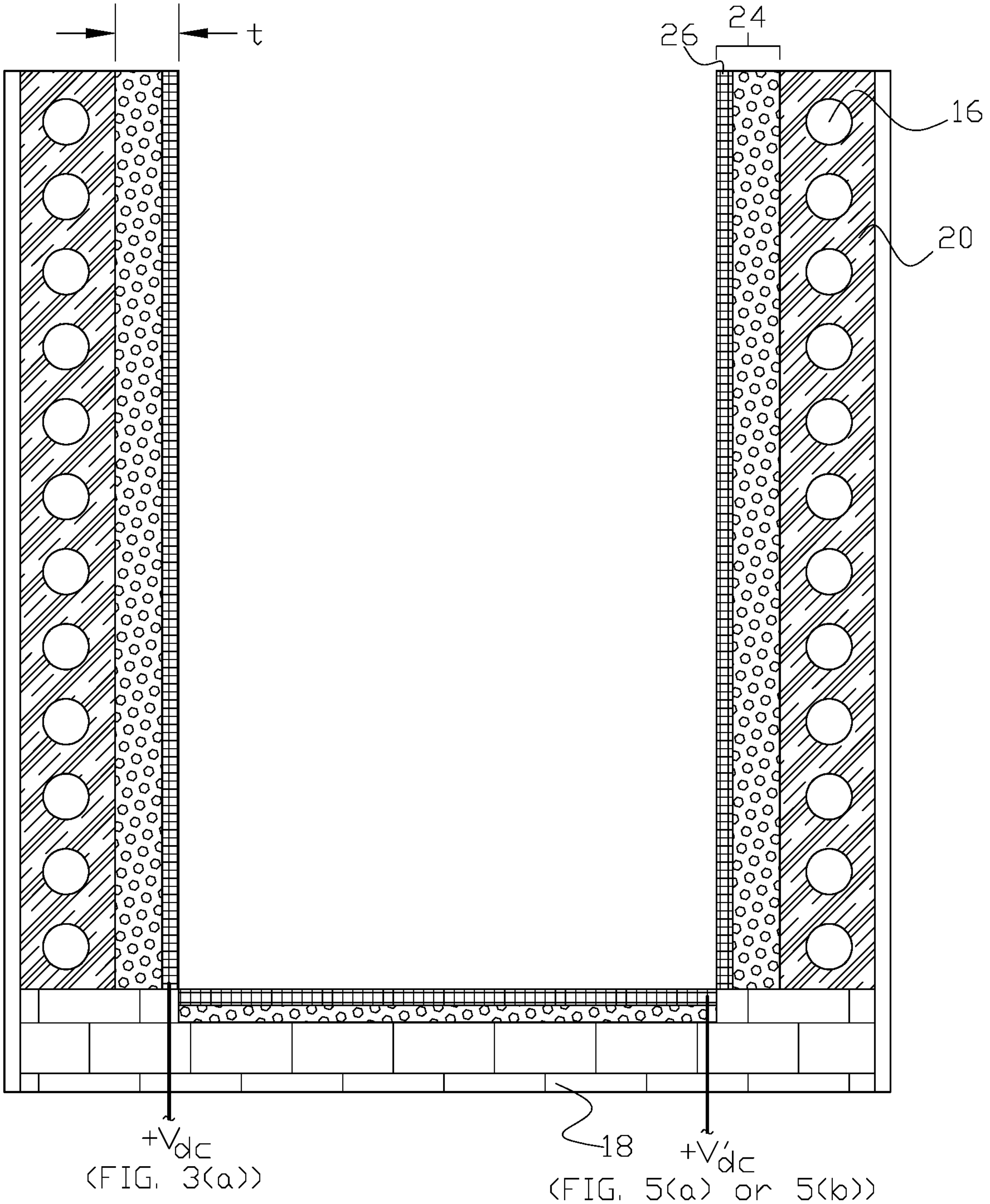
Figure 6F:
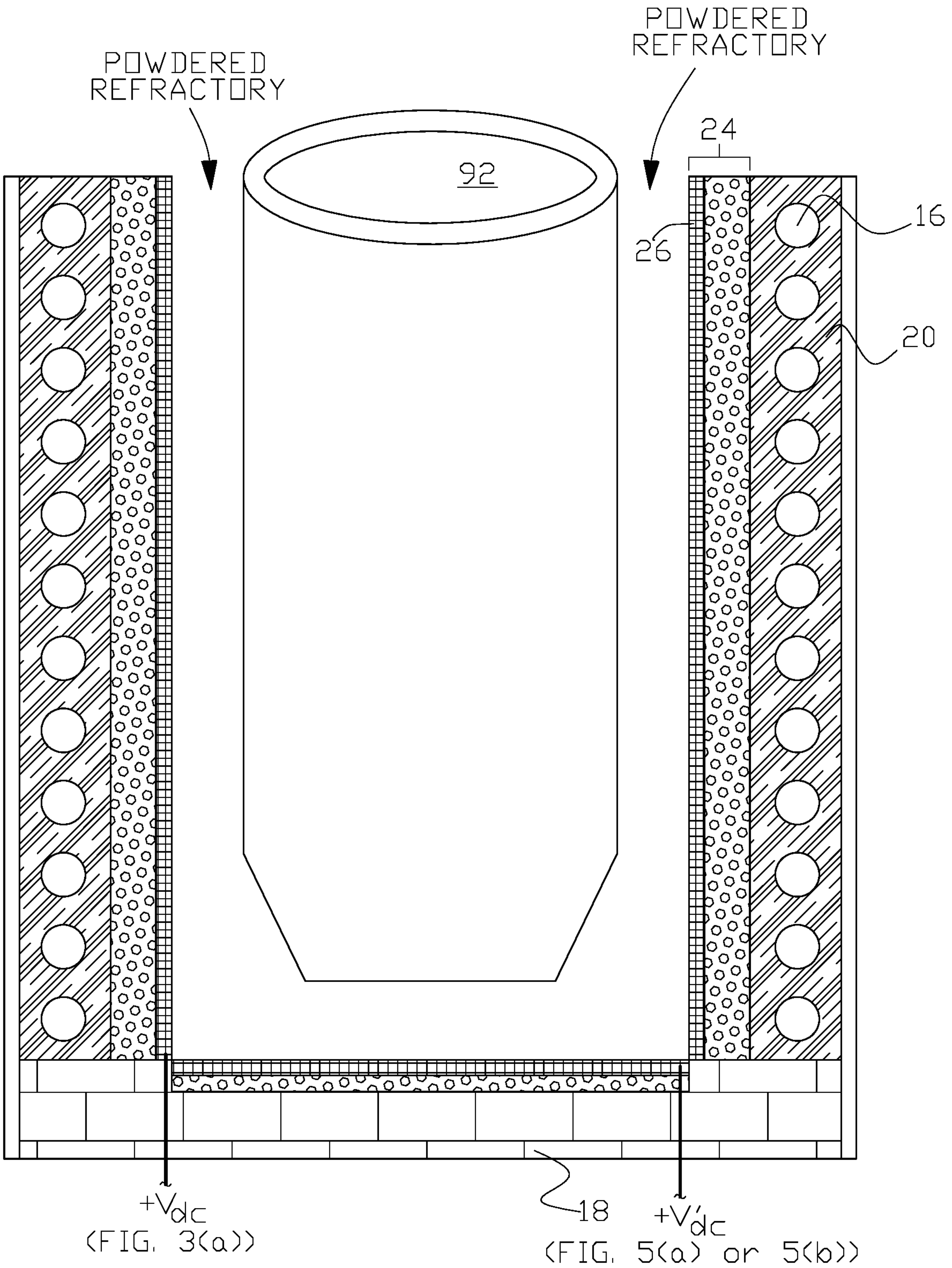
Figure 6G:
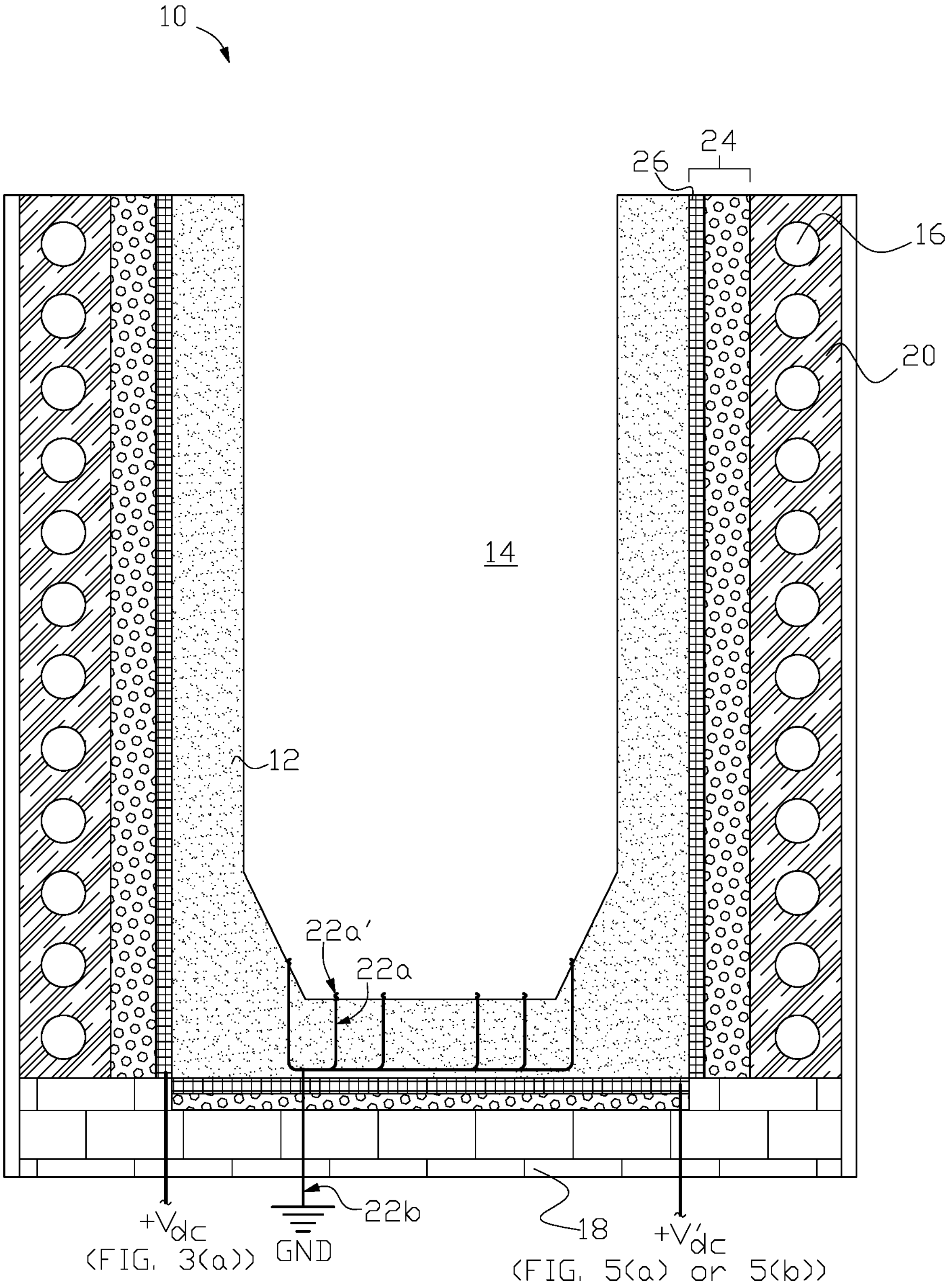

A suitable temporary cast flowable refractory mold 90 (or molds forming a formwork) for example, in the shape of an open right cylinder, is positioned within the volume formed by coil 16 and refractory material 20 to form a cast flowable refractory annular volume between refractory material 20 and the outer wall perimeter of the mold as shown in FIG. 6(*c*). Mesh 26 is fitted around the outer perimeter of temporary mold 90 and the cast flowable refractory 24, such as INDUCTOCOAT™ 35AF-FLOW (available from Inductotherm Corp., Rancocas, New Jersey), can be poured into the cast flowable refractory annular volume to set and form hardened castable refractory 24 as shown in FIG. 6(*d*). Vibrating compactors can be used to release trapped air and excess water from the cast flowable refractory so that the refractory settles firmly in place in the formwork before setting. Mesh 26 will be at least partially embedded in cast flowable refractory 24 when it sets inside of the cast flowable refractory annular volume. In other examples of the invention mesh 26 can be embedded anywhere within the thickness, t, of cast flowable refractory 24. For example as shown in FIG. 7, mesh 26 is offset by distance, $t_1$, from the inner wall perimeter of cast flowable refractory 24. Offset embedment can be achieved by installing suitable standoffs 91 around the outer perimeter of mold 90 as shown in FIG. 6(*d*) and then fitting mesh 26 around the standoffs before pouring the cast flowable refractory. In the broadest sense as used herein, the terminology mesh "embedded" in a cast flowable refractory means the mesh is either fixed within the refractory; at a surface boundary of the refractory, or sufficiently, but not completely, embedded at a surface boundary of the refractory so that the mesh is retained in place in the refractory after the refractory sets.

After cast flowable refractory 24 sets, temporary mold 90 is removed, and a replaceable lining mold 92 that is shaped to conform to the boundary wall and bottom of interior furnace volume 14 can be positioned within the volume formed by set cast flowable refractory 24 (with embedded mesh 26) to form a replaceable lining annular volume between set cast flowable refractory 24 and the outer wall perimeter of the lining mold 92 as shown in FIG. 6(*e*). A conventional powdered refractory can then be fed into the lining volume according to conventional procedures. If lining mold 92 is formed from an electrically conductive mold material, lining mold 92 can be heated and melted in place according to conventional procedures to sinter the lining refractory layer that forms the boundary of furnace volume 14. Alternatively the lining mold may be removed and sintering of the lining refractory layer may be accomplished by direct heat application.

Distinction is made between the replaceable lining refractory, which is typically a powdered refractory and the cast flowable refractory in which the electrically conductive mesh is embedded. The cast flowable refractory is used so that the electrically conductive mesh can be embedded in the refractory. The cast flowable refractory is also referred to herein as castable refractory and flowable refractory.

FIG. 6(*g*) illustrates an electric induction furnace with one example of a lining wear detection system of the present invention with addition of typical furnace ground leak detector system probe wires 22*a* and electrical ground lead 22*b* that is connected to a furnace electrical ground (GND).

The fabrication process described above and as shown in FIG. 6(*a*) through FIG. 6(*g*) illustrates one example of fabrication steps exemplary to the present invention. Additional conventional fabrication steps may be required to complete furnace construction.

Figure 10:
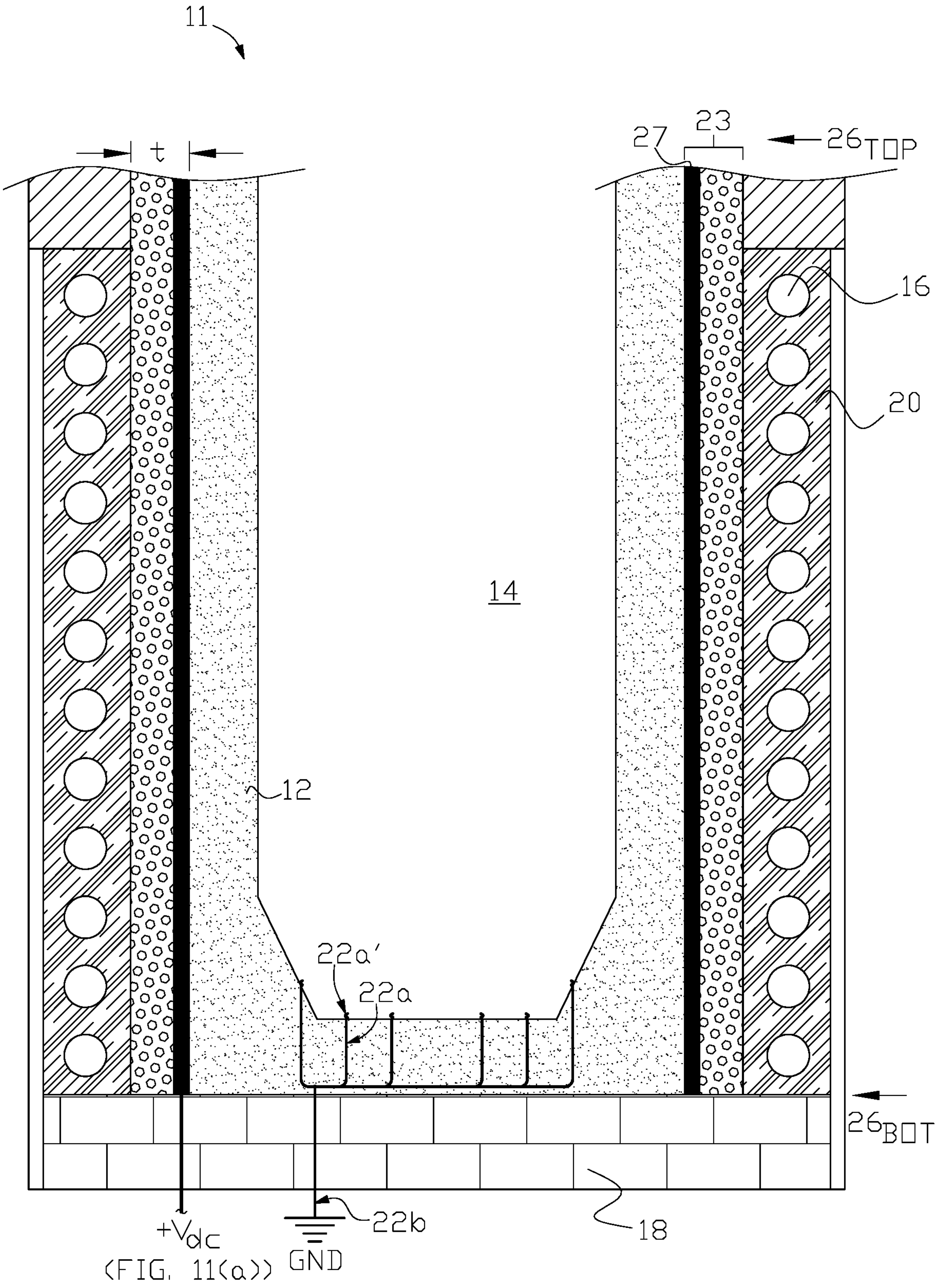
FIG. 10 is a cross sectional diagram of another example of an electric induction furnace with a lining wear detection system of the present invention that uses an electrically conductive wire assemblage embedded in a wire assemblage embedded refractory.
Figure 11A:
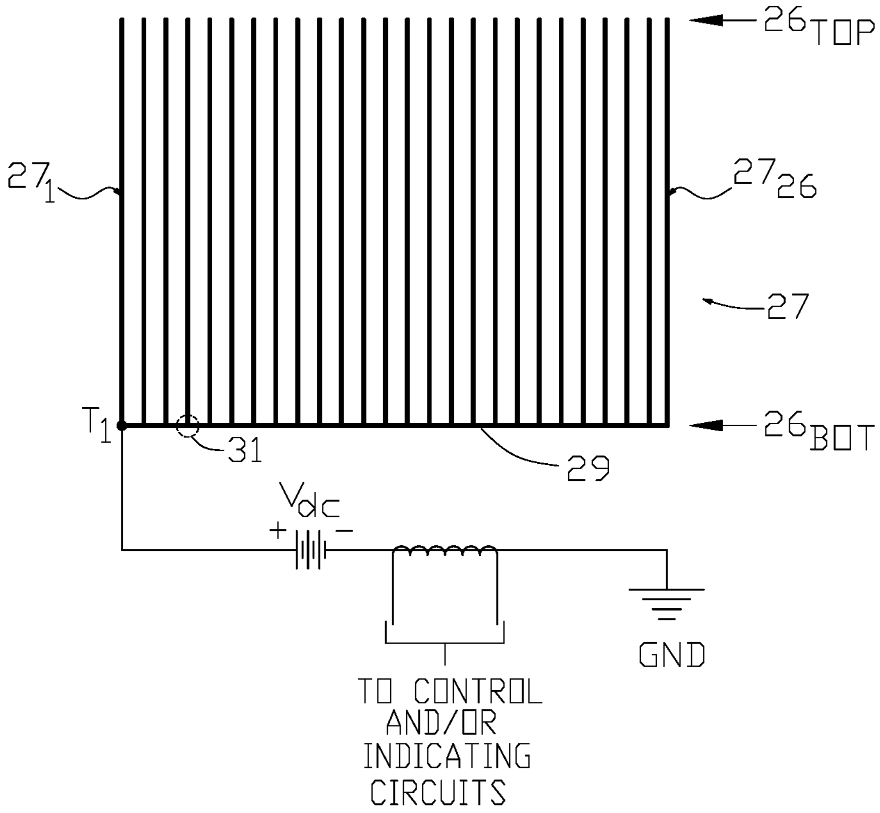
FIG. 11(*a*) illustrates in flat planar view one example of an electrically conductive wire assemblage, a lining wear detection circuit, and a control and/or indicating (detector) circuit used in the electric induction furnace shown in FIG. 10.
Figure 11B:
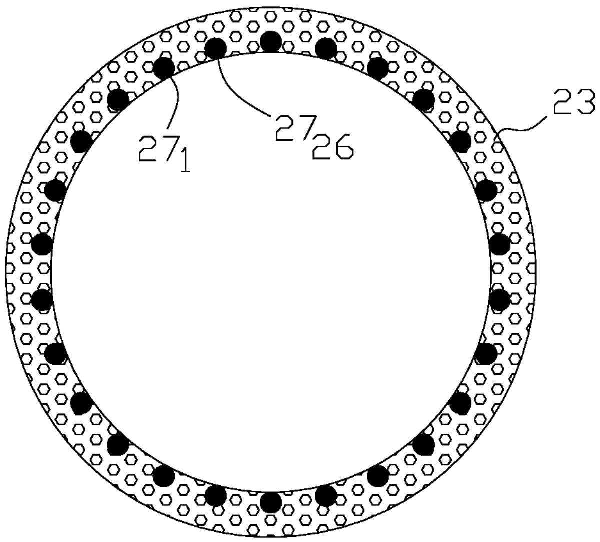
Figure 12A:
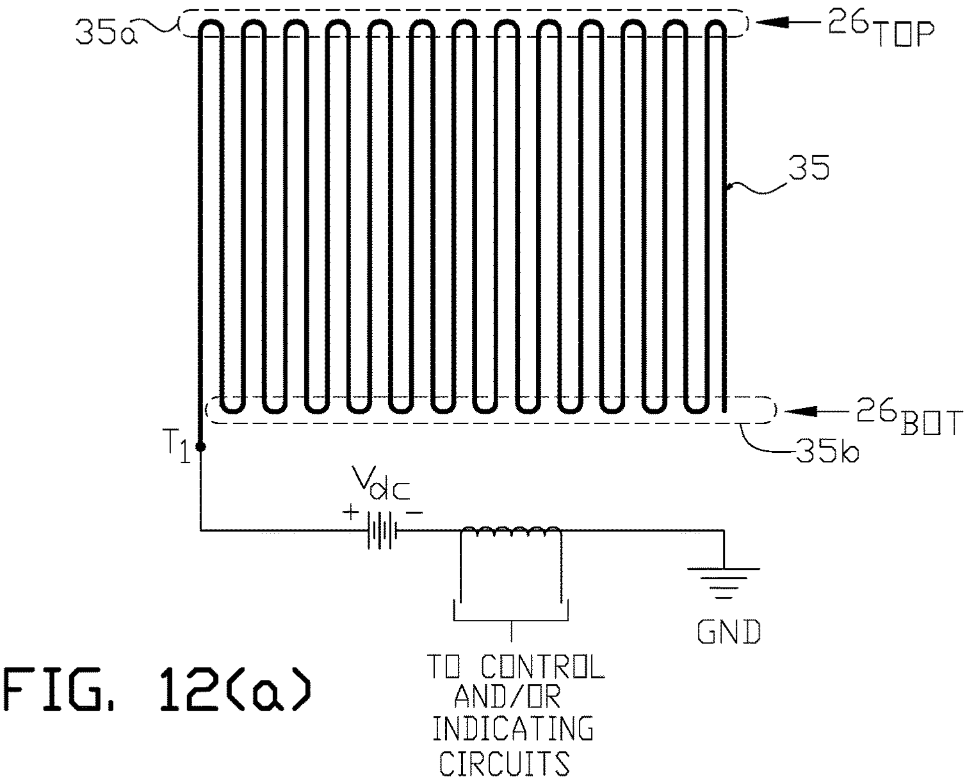
FIG. 12(*a*) illustrates in flat planar view another example of an electrically conductive wire assemblage, a lining wear detection circuit, and a control and/or indicating (detector) circuit that can be used in the furnace volume shown in FIG. 10.
Figure 12E:
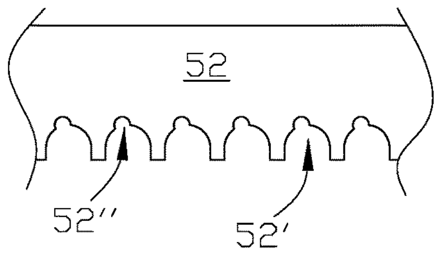
Figure 12C:
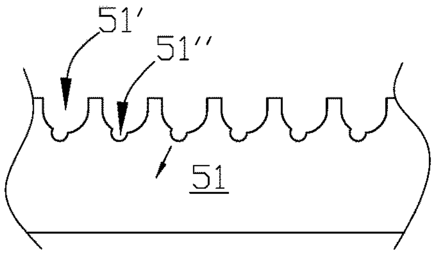
Figure 12B:
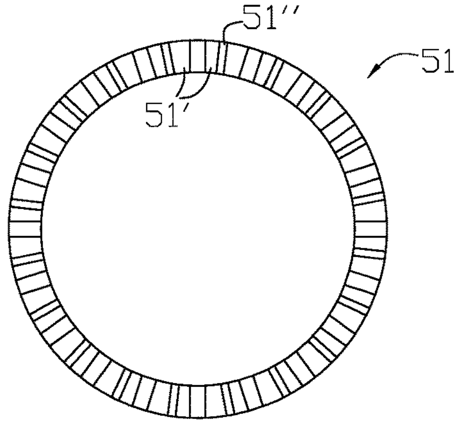
Figure 12D:
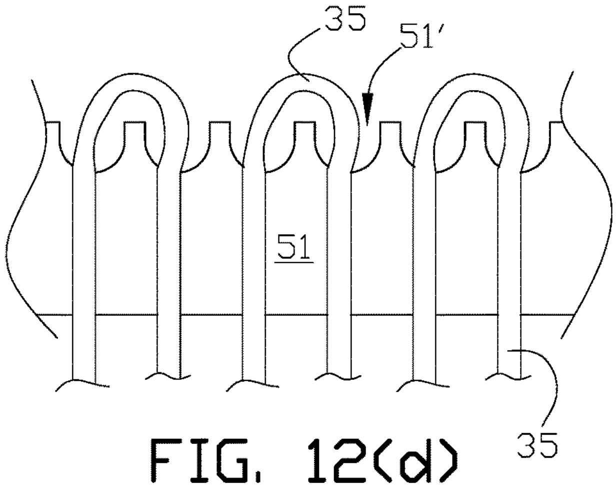

There is shown in FIG. 10 one example of an electric induction furnace 11 with a lining wear detection system of the present invention. A wall refractory 23 is disposed between coil 16 and replaceable furnace lining 12. The refractory may be a castable or trowelable refractory. In this example of the invention, electrically conductive wire assemblage 27 is embedded within the inner boundary of wall refractory 23 that is adjacent to the outer boundary of lining 12. One non-limiting example of a suitable electrically conductive wire assemblage is formed from an assemblage of stainless or copper nickel stranded wire in a range from 18 to 10 AWG depending upon the particular configuration of the induction furnace. In other arrangements of the invention other types of electrically conductive wire may be used as suitable for a particular application. The wire may be bare or insulated if arcing is an issue in a particular application. Stranded wire is preferred although solid wire may be used in some applications. As shown in FIGS. 11(*a*) and 11(*b*), for this example of the invention, electrically conductive wire assemblage 27 forms a vertical wire cage between refractory 23 and consumable lining 12 from the top ($\mathbf{26}_{TOP}$) to the bottom ($\mathbf{26}_{BOT}$) of the outer boundary of the lining wall. In this example of the invention twenty-six vertical wires $\mathbf{27}_1$ to $\mathbf{27}_{26}$ are vertically spaced apart from each other around the circumference of wire assemblage refractory 23. In this example of the invention the twenty-six vertically oriented wires are electrically connected together by suitable electrically connecting means such as multiple tap connecters or wire lugs 31 to bottom collector wire 29 of electrically conductive wire assemblage 27.

More generally the number of vertical wires used depends upon the configuration of a particular induction furnace and are referred to as riser protection wires. While vertically-oriented riser protection wires are shown in the above example of the invention, in other examples the arrangement of riser protection wires around the circumference of refractory 23 may be of other configurations such as a spiral configuration. While a bottom collector wire is used in the above example of the invention the collector wire may be located anywhere between the top and bottom ends of the riser protection wires and there may be more than one collector wire depending upon a particular application.

In the above example of the invention, collector wire 29 is connected at a single terminal point $T_1$ to a positive electric potential that can be established by a suitable voltage source, such as direct current (DC) voltage source $V_{dc}$ that has its other (negative) terminal connected to furnace electrical ground (GND). A lining wear detection circuit is formed between the positive electric potential connected to electrically conductive wire assemblage 27 and the negative electric potential connected to the furnace electrical ground. As shown in FIG. 11(*a*) the voltage source circuit can be connected to control circuits and/or indicating circuits via suitable circuit elements such as a current transformer. Alternatively a direct measurement of leakage current can be provided with suitable direct measurement device such as, but not limited to, a current shunt resistor. The control and/or indicating circuits are referred to collectively as a detector. As consumable lining 12 is gradually consumed during the service life of the furnace, DC leakage current will rise, which can be sensed in the control/indicating circuits. For a particular furnace design, a leakage current rise level set point can be established for indication of lining replacement when the furnace is properly operated and maintained.

FIG. 12(*a*) illustrates an alternative to the protective riser wires shown in FIG. 11(*a*). In FIG. 12(*a*) a single continuous protective riser wire 35 is provided by weaving the riser wire around the top and bottom circumferences of the induction furnace. Top fitting 51 as shown in FIG. 12(*b*) and FIG. 12(*c*) is used to facilitate weaving the single continuous protective wire 35. Fitting 51 is generally cylindrical in shape and has top wire turn notches 51' that facilitate turn of the continuous wire at the top of the furnace during installation. Each notch 51' comprises a generally semicircular volume as seen in cross section in FIG. 12(*c*) and FIG. 12(*d*) that is larger in cross section than the cross sectional diameter of wire 35 to allow rapid insert into the wire seating sub-notch 51" at the bottom of each wire turn notch 51' that has a cross sectional diameter slightly larger than the cross sectional diameter of wire 35. Off-centering of wire seating sub-notch 51" in the direction of the top-to-bottom weave (illustrated by the arrow in FIG. 12(*c*) assists in making the turn of the protective riser wire 180 degrees from the upward to downward direction at the top of the furnace. A bottom fitting 52 as shown in FIG. 12(*e*) is provided to facilitate weaving of the single protective wire 35 at the bottom of the furnace being assembled. Bottom fitting 52 is similar to top fitting 51 with complementary arranged bottom wire turn notches 52' and wire seating sub-notches 52".

Figure 13:
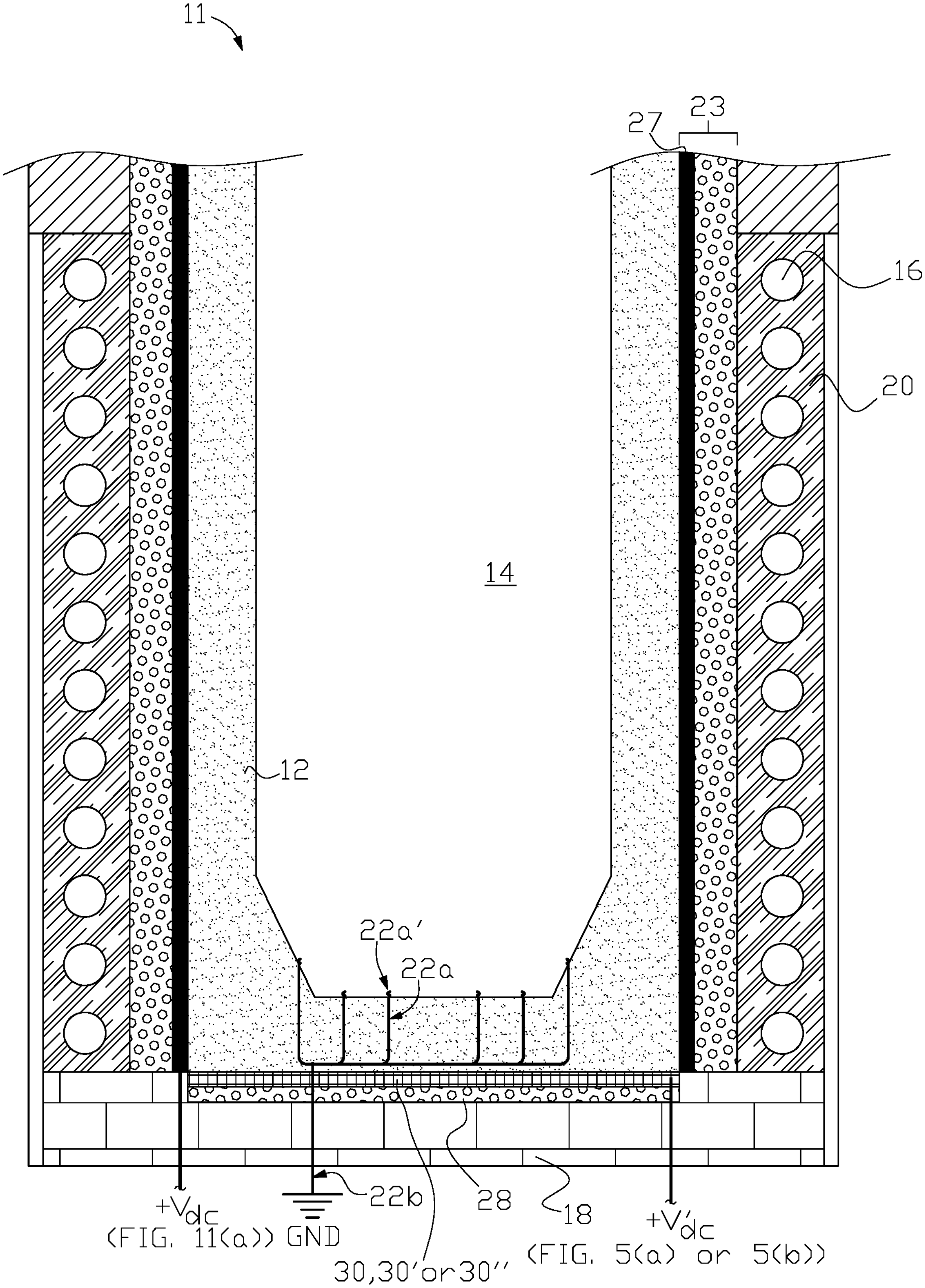
FIG. 13 is a cross sectional diagram of another example of an electric induction furnace with a lining wear detection system of the present invention that includes a bottom electrically conductive mesh.
Figure 14A:
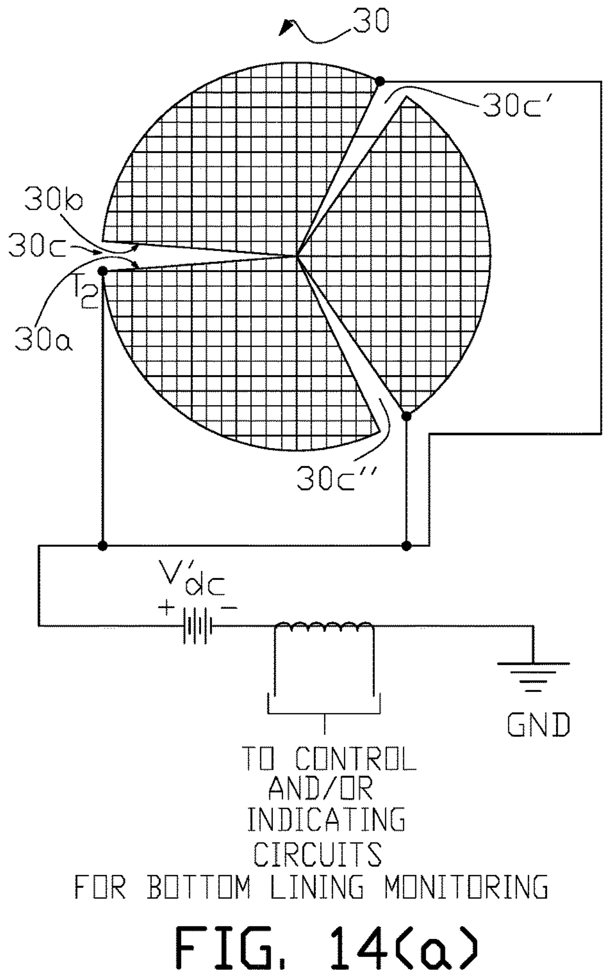
FIGS. 14(*a*), 14(*b*) and 14(*c*) illustrate in top plan view alternative bottom electrically conductive discontinuous mesh; continuous mesh; and wire assemblage, with bottom lining wear detection circuit, and control and/or indicating (detector) circuit used for bottom lining wear detection in one example of the present invention.
Figure 14B:
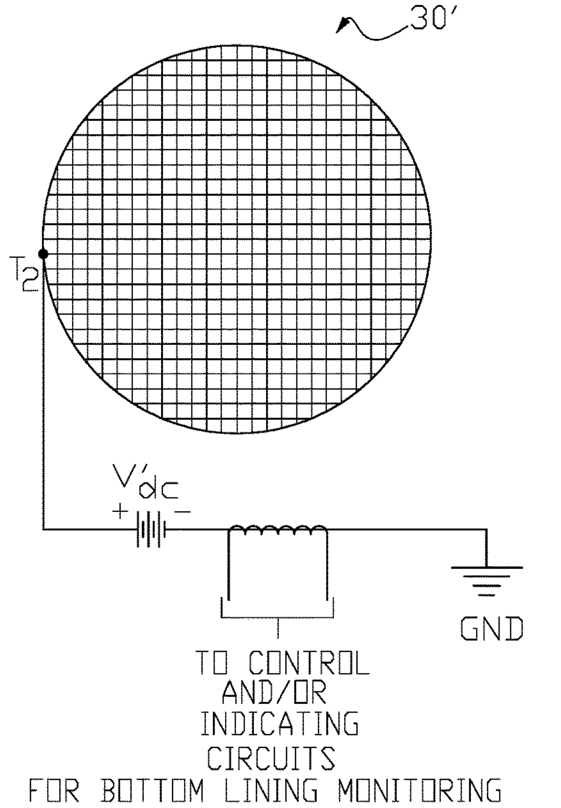
Figure 14C:
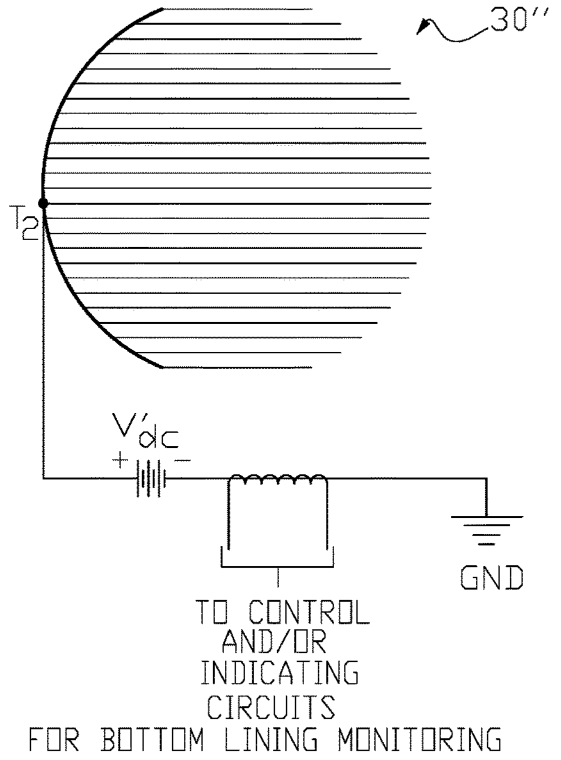
Figure 15A:
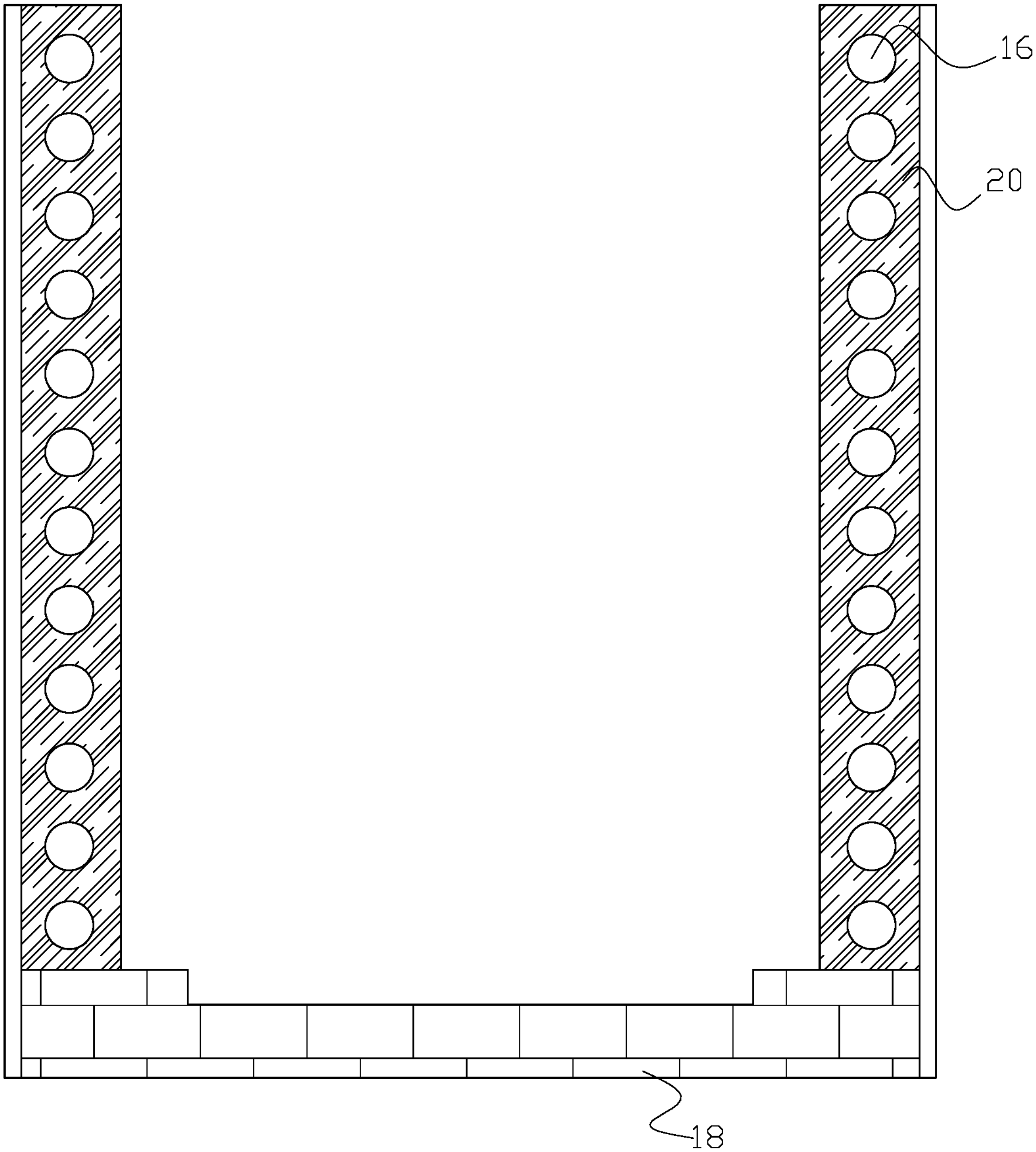
FIG. 15(*a*) through FIG. 15(*h*) illustrate fabrication of alternative examples of an electric induction furnace with a lining wear detection system of the present invention that use an electrically conductive wire assemblage embedded in a wire assemblage embedded refractory.
Figure 15B:
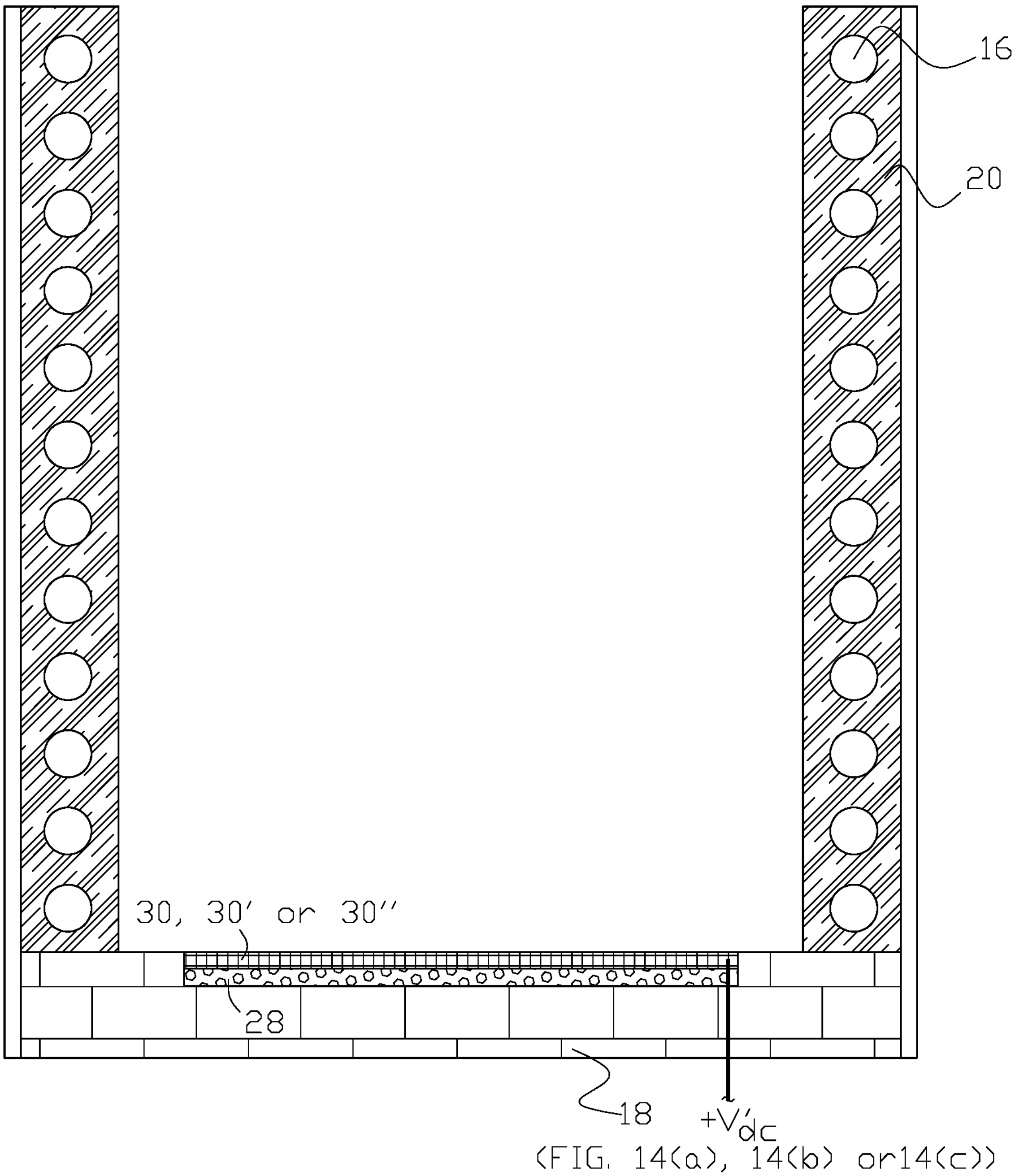
Figure 15C:
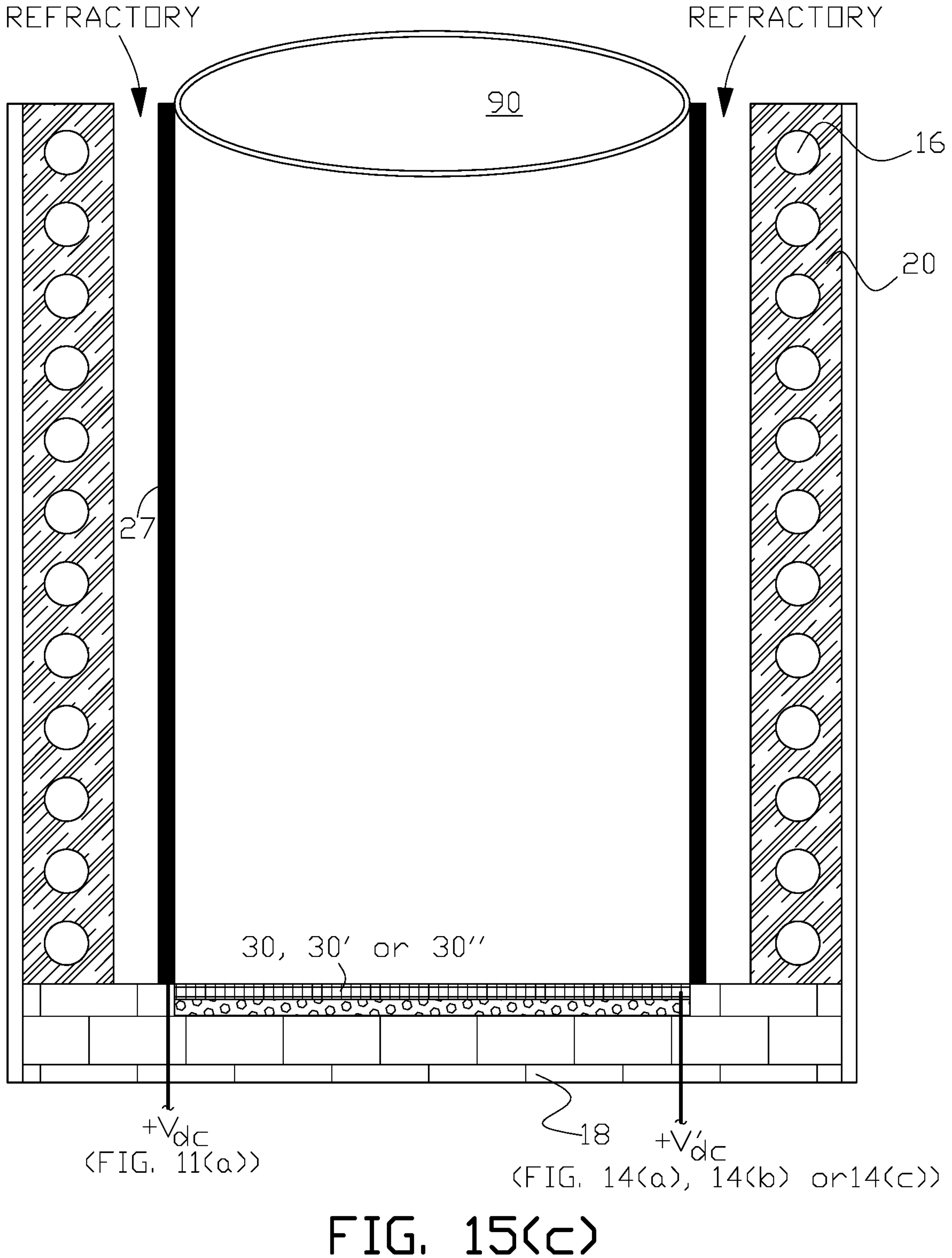
Figure 15D:
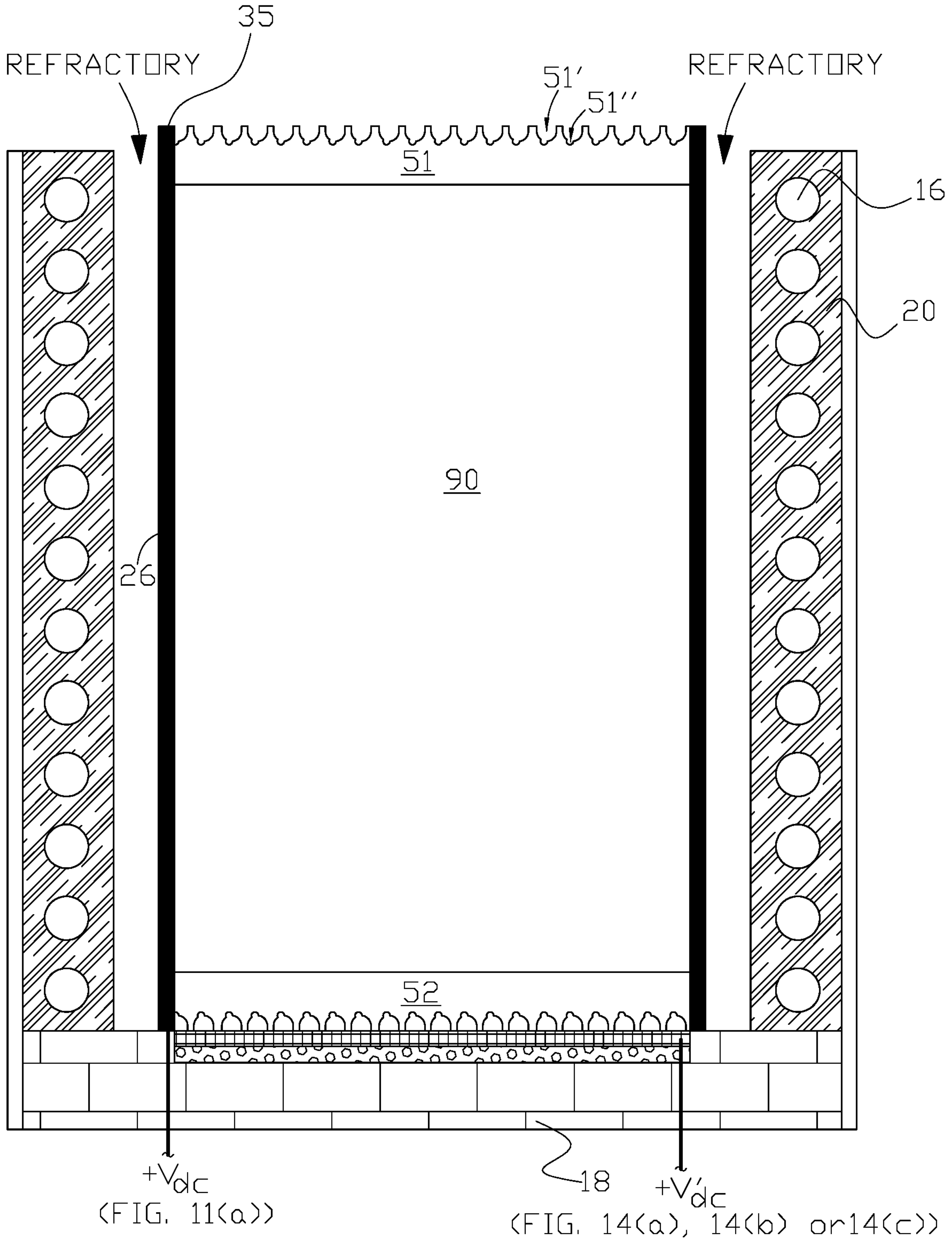
Figure 15E:
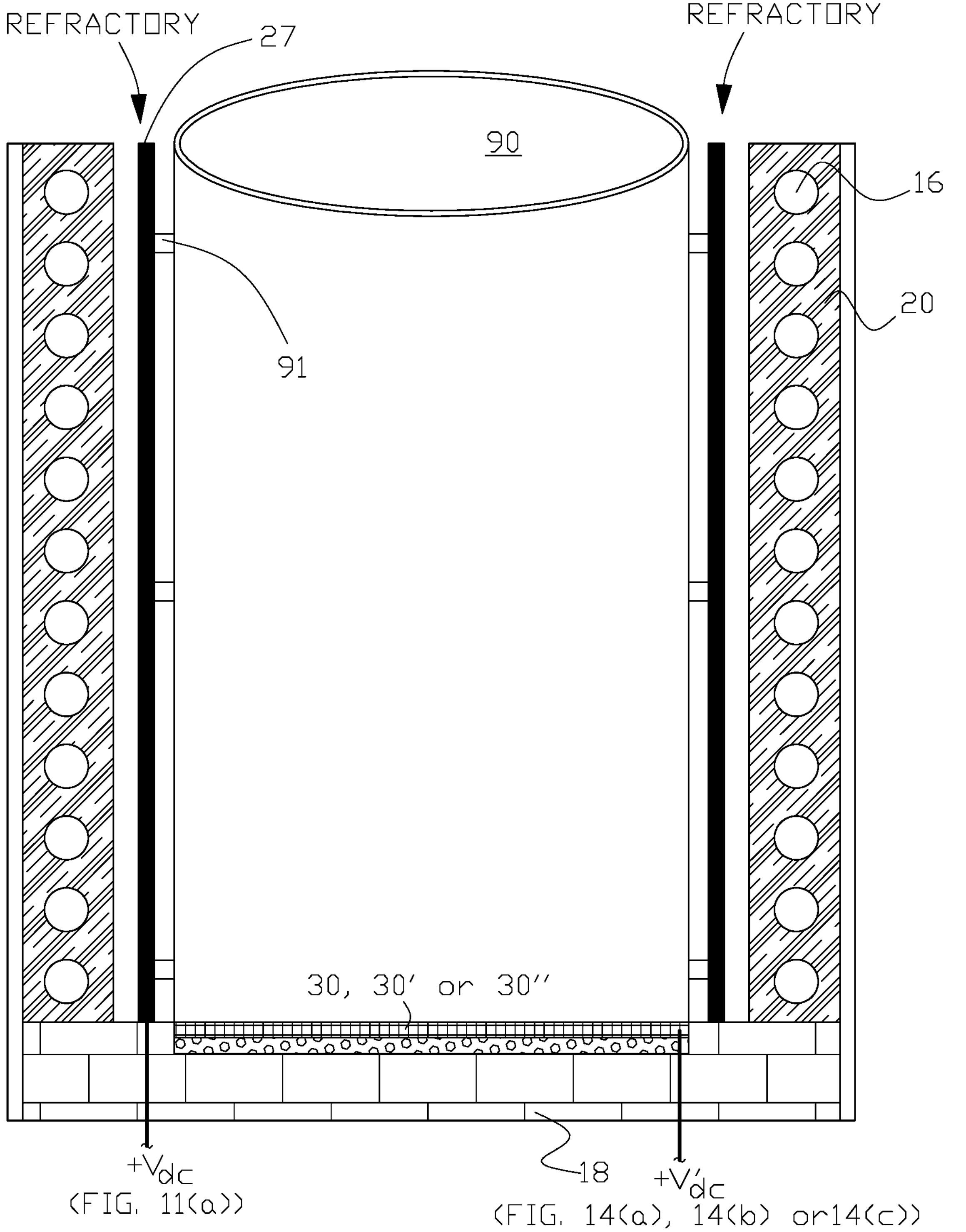
Figure 15F:
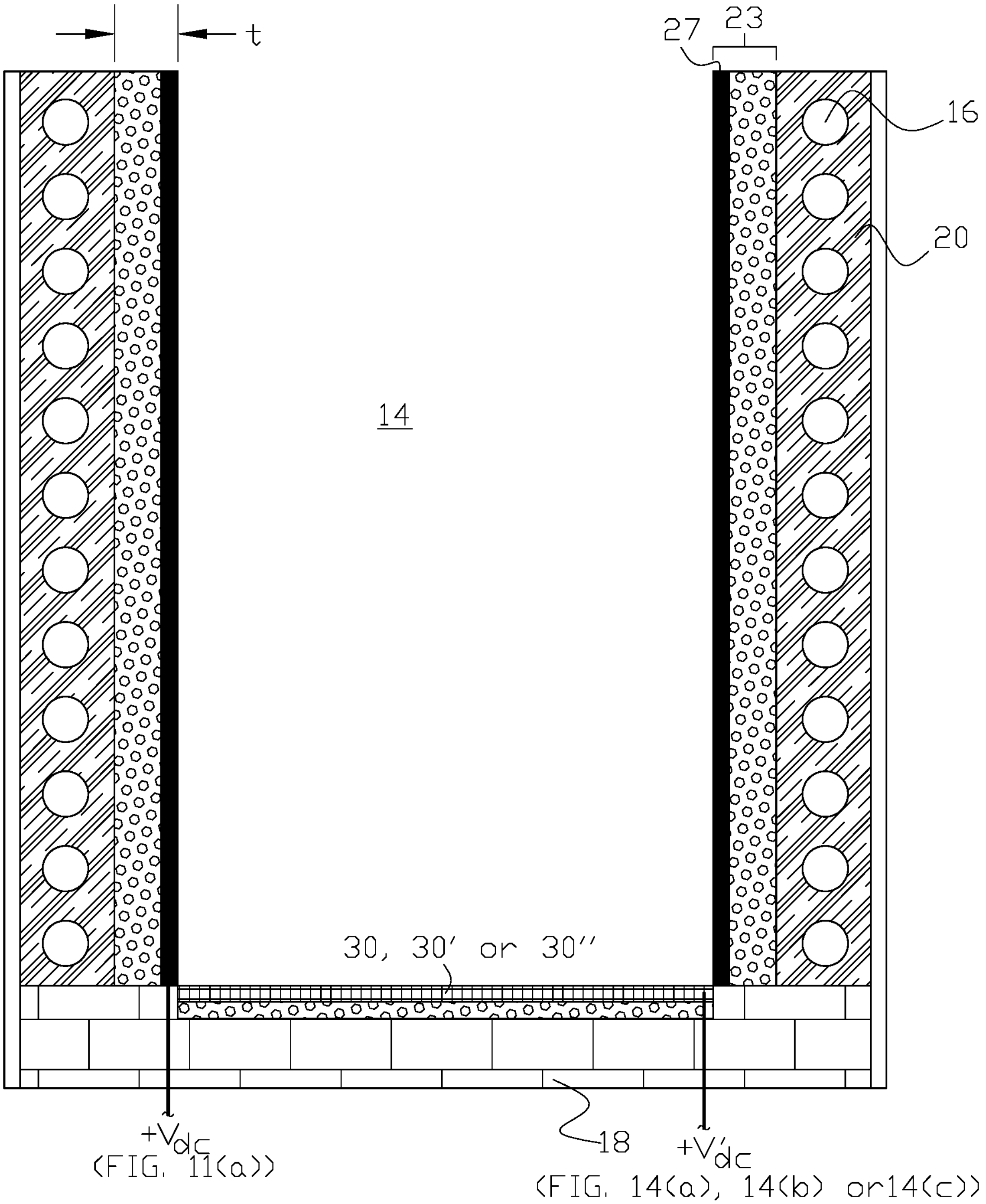
Figure 15G:
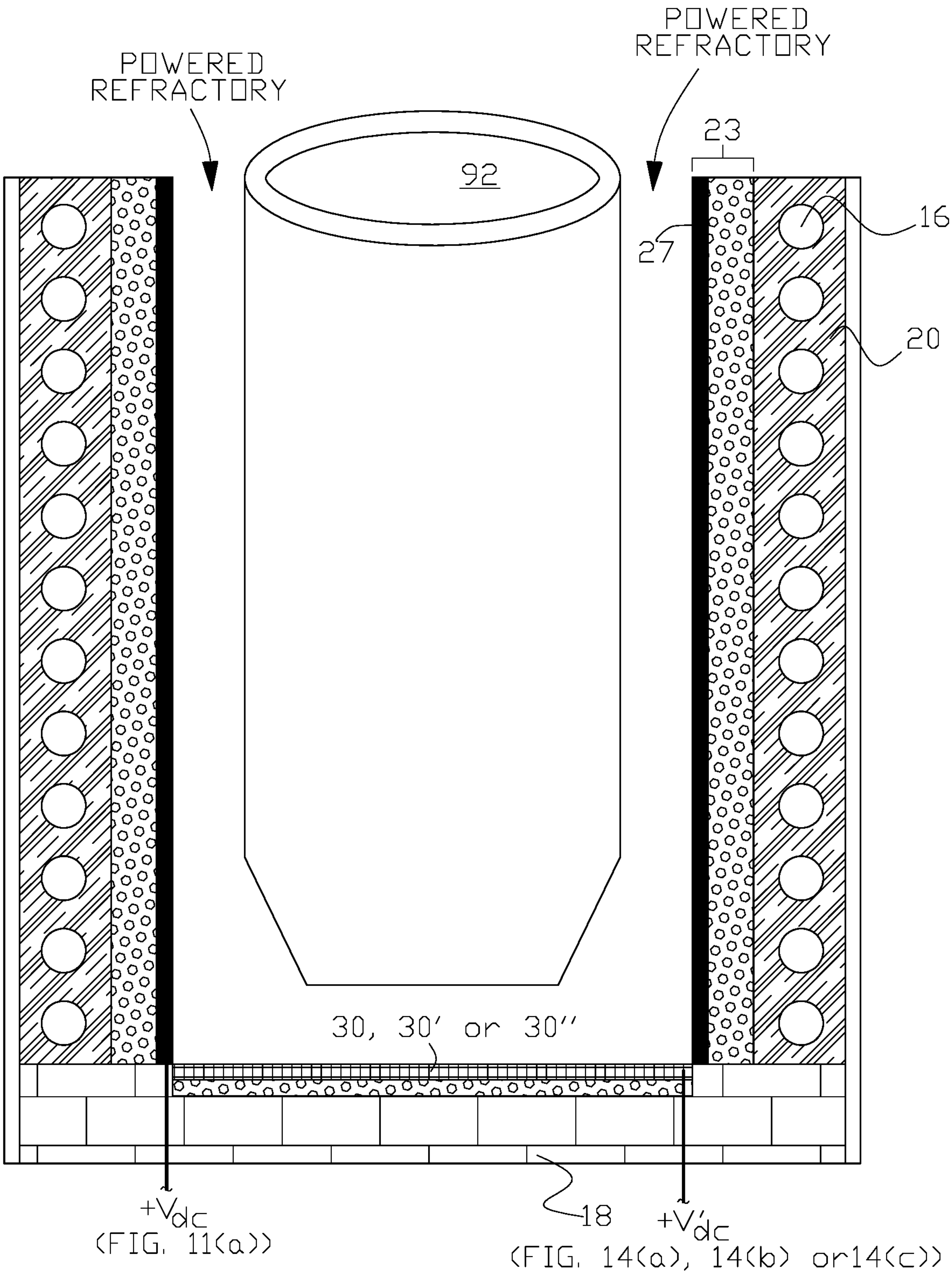
Figure 15H:
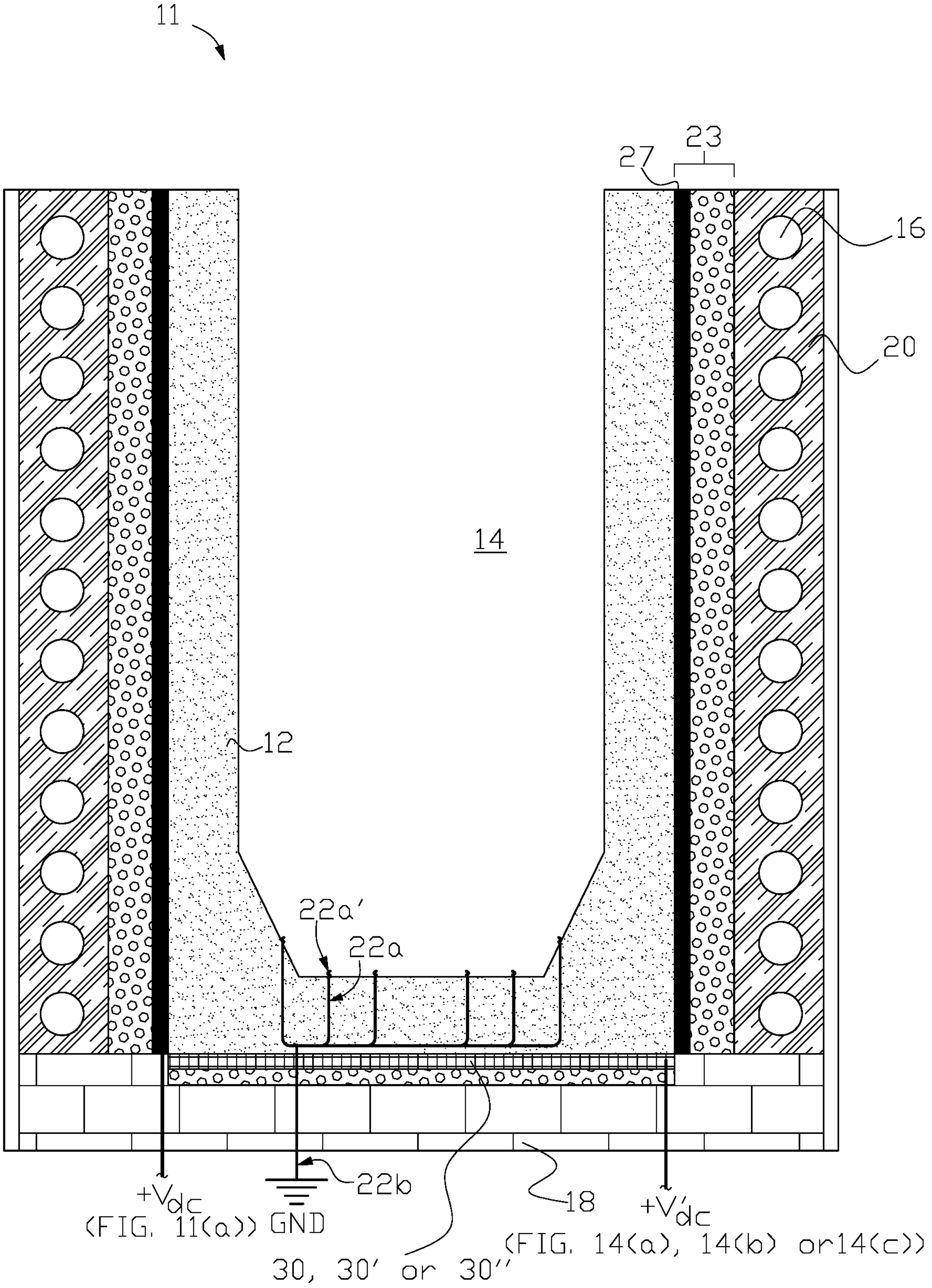

In some examples of the invention, a bottom lining wear detection system may be provided as alternatively shown, for example in FIG. 14(*a*), 14(*b*) or 14(*c*), in addition to one of the wall lining wear detection systems shown in FIG. 11(*a*) and FIG. 11(*b*). In FIG. 13 electrically conductive discontinuous bottom mesh 30; continuous bottom mesh 30'; or wire assemblage 30" is disposed within bottom refractory 28 with bottom mesh 30 adjacent to the lower boundary of lining 12 at the bottom of the furnace. For the bottom lining wear system shown in FIG. 14(*a*), bottom mesh 30 forms an electrically discontinuous circular mesh boundary between bottom refractory 28 and the bottom of lining 12. In alternative applications of the invention, the bottom mesh boundary may be formed from a continuous circular mesh 30' as shown in FIG. 14(*b*) between bottom cast flowable refractory 28 and the bottom of lining 12, or one or more electrically conductive wire assemblage 30" as shown in FIG. 14(*c*). In examples of the invention where the electrically discontinuous bottom mesh 30 is used, at least one discontinuous radial side 30*a* of bottom mesh 30 is suitably connected to a positive electric potential established by a suitable voltage source $V'_{dc}$ that has its other terminal connected to furnace electrical ground (GND). A bottom lining wear detection circuit is formed between the positive electric potential connected to the electrically conductive bottom mesh or wire assemblage and the negative electric potential connected to the furnace electrical ground. In applications where it is used, the at least one radial electrical discontinuity 30*c* in mesh 30 is sized to prevent short circuiting between opposing radial sides 30*a* and 30*b* of mesh 30 and may include multiple discontinuities 30*c*, 30*c*' and 30*c*" as shown in FIG. 14(*a*). In alternative applications of the invention, the bottom mesh boundary may be formed from a continuous circular mesh 30' as shown in FIG. 14(*b*) between bottom cast flowable refractory 28 and the bottom of lining 12, or one or more electrically conductive wire assemblage 30" as shown in FIG. 14(*c*). Alternatively the mesh may be fabricated in a manner so that the mesh is electrically isolated from itself. As shown in the alternative arrangements of FIG. 14(*a*), FIG. 14(*b*) and FIG. 14(*c*), the bottom lining wear detection circuit can be connected to a bottom lining wear control and/or indicating circuits, which are collectively referred to as a detector. As the bottom of lining 12 is gradually consumed during the service life of the furnace, DC leakage current will rise, which can be sensed in the bottom lining wear control and/or indicating circuits. For a particular furnace design, a leakage current rise level set point can be established for indication of lining replacement, based on bottom lining wear, when the furnace is properly operated and maintained.

Figure 17:
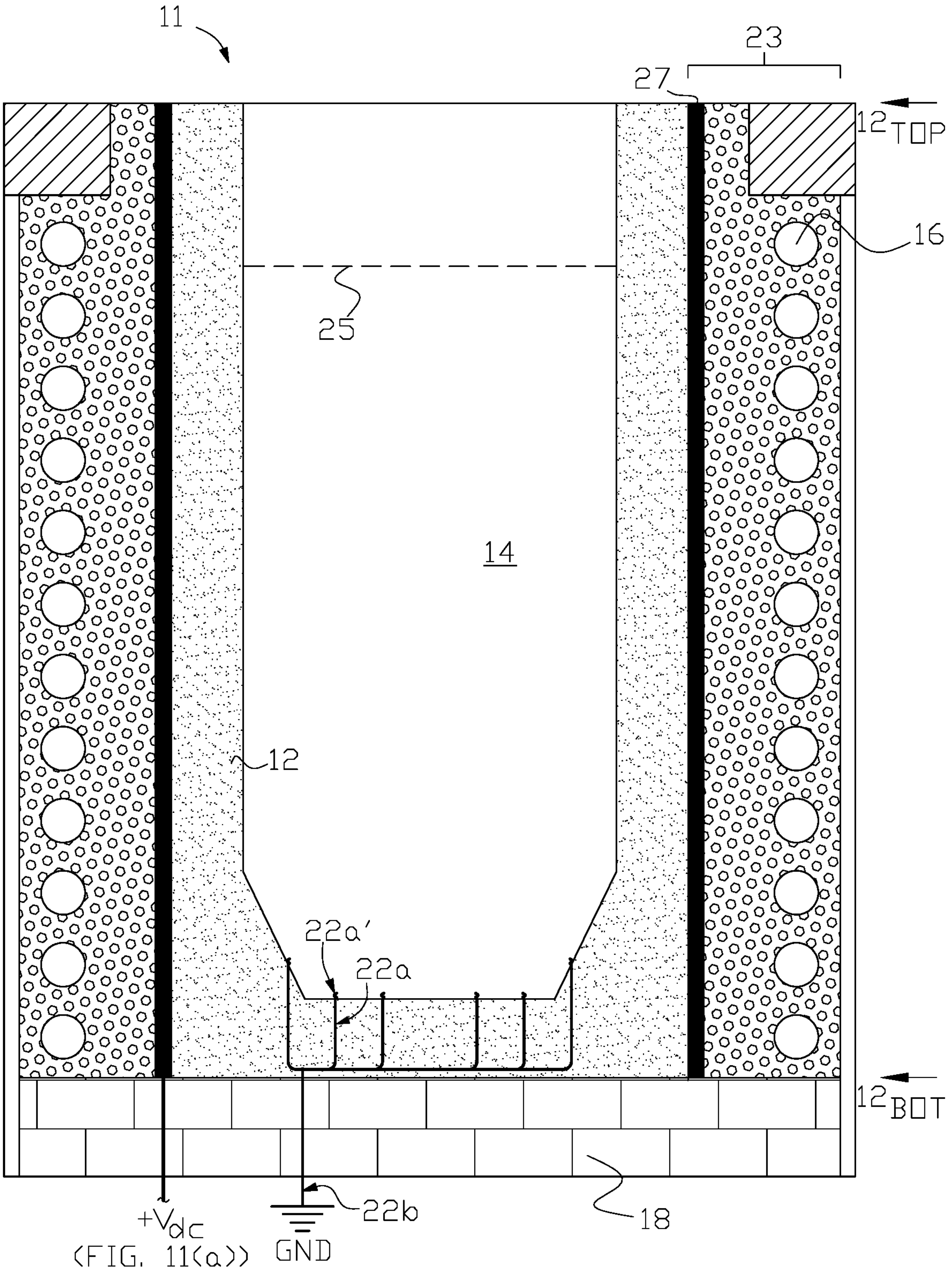
FIG. 17 is a cross sectional diagram of another example of an electric induction furnace with a lining wear detection system of the present invention that uses an electrically conductive wire assemblage embedded in a wire assemblage embedded refractory.

In some examples of the invention, electrically conductive wire assemblage 27 or 35 may extend for the entire vertical height of lining 12, that is, from the bottom ($\mathbf{12}_{BOT}$) of the furnace lining to the very top ($\mathbf{12}_{TOP}$) of the furnace lining that is above the nominal design melt line 25 for a particular furnace as shown, for example, in FIG. 17 for electrically conductive wire assemblage 27.

Figure 18B:
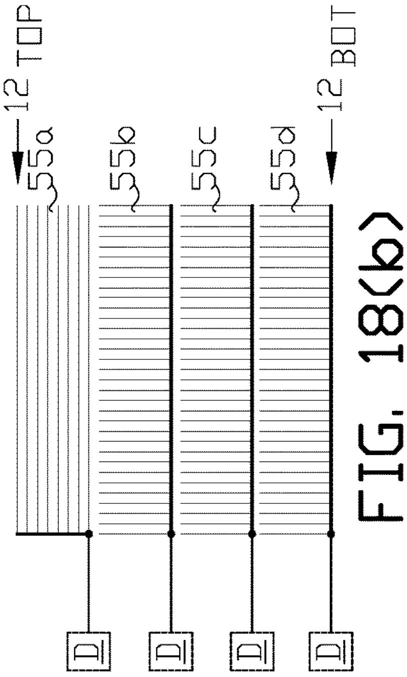
FIG. 18(*a*) through FIG. 18(*c*) illustrate alternative arrangements of electrically conductive wire assemblage, lining wear detection circuits and detectors used in the electric induction furnace with a lining wear detection system of the present invention.
Figure 18C:
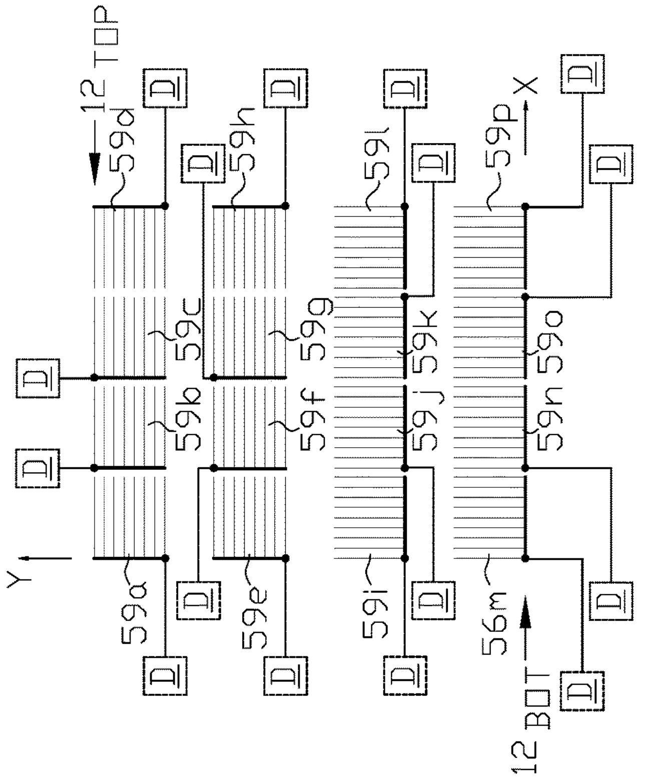
Figure 18A:
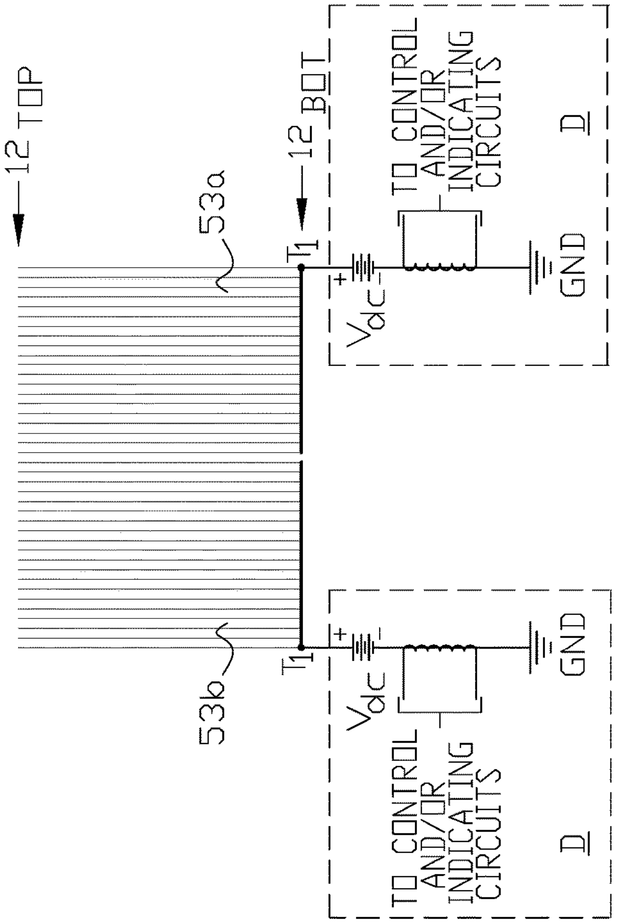

In other applications, electrically conductive wire assemblage 27 may be provided in one or more selected discrete regions along the vertical height of lining 12. For example in FIG. 18(*a*) electrically conductive wire assemblage comprises two vertical electrically conductive wire assemblages 53*a* and 53*b* that are electrically isolated from each other and connected to separate lining wear detection circuits so that lining wear can be sensed as being on either one half side of the furnace lining. Further any multiple of separate, vertically oriented and electrically isolated wall electrically conductive wire assemblage regions may be provided along the vertical height of lining 12 with each separate wall region being connected to a separate lining wear detection circuit so that lining wear could be localized to one of the wall regions. Alternatively the multiple electrically conductive wire assemblages 53*a* and 53*b* in FIG. 18(*a*) can be horizontally oriented with each electrically isolated electrically conductive wire assemblage connected to a separate lining wear detection circuit and control and/or indicating circuits (D) so that lining wear can be localized to one of the isolated wire assemblage regions. One or more of the vertical risers may be oriented in different directions. For example wire assemblage 55*a* at the top of the furnace in FIG. 18(*b*) has the protection wires oriented with horizontal while wire assemblages 55*b*, 55*c* and 55*d* are vertically oriented. Most generally as shown in FIG. 18(*c*) the multiple electrically conductive wire assemblage 59*a* through 59*p* can be arrayed around the height of the replaceable lining wall with each electrically conductive wire assemblage connected to a separate lining wear detection circuit (D) with control and/or indicating circuit so that lining wear can be localized to one of the isolated electrically conductive wire assemblage regions that can be defined by a two-dimensional X-Y coordinate system around the circumference of the replaceable lining wall with the X (horizontal) coordinate defining a position around the circumference of the lining and the Y (vertical) coordinate defining a position along the height of the lining.

In similar fashion bottom, discontinuous mesh 30, continuous mesh 30' or wire assemblage 30" may cover less than the entire bottom of replaceable lining 12 in some examples of the invention, or comprise a number of electrically isolated bottom meshes or wire assemblages with each of the electrically isolated bottom meshes or wire assemblages connected to a separate lining wear detection circuit so that lining wear could be localized to one of the bottom mesh or wire assemblages regions.

As an alternative to a separate detector (control and/or indicating circuits) for each lining wear detection circuit in the above examples, a single detector can be switchably connected to the lining wear detection circuits associated with two or more of the electrically conductive meshes or wire assemblages in all examples of the invention.

While the figures illustrate separate wall electrically conductive wire assemblage and bottom lining wear detection systems, in some examples of the invention, a combined wall electrically conductive wire assemblage and bottom lining wear detection system may be provided either by (1) providing a continuous side electrically conductive wire assemblage and bottom mesh or wire assemblage embedded in a refractory with a single lining wear detection circuit and detector or (2) providing separate side electrically conductive wire assemblage and bottom meshes or wire assemblages embedded in a cast flowable refractory with a common lining wear detection circuit and detector.

FIG. 15(*a*) through FIG. 15(*h*) illustrate examples of fabrication of an electric induction furnace with a lining wear detection system of the present invention with a side electrically conductive wire assemblage. Induction coil 16 can be fabricated (typically wound) and positioned over suitable foundation 18. As shown in FIG. 15(*a*) trowelable refractory (grout) material 20 can be installed around the coil as in the prior art. One suitable proprietary trowelable refractory material 20 is INDUCTOCOAT™ 35AF (available from Inductotherm Corp., Rancocas, New Jersey). If a bottom lining wear detection system is used, an alternative bottom mesh 30 or 30', or wire assemblage 30" can be fitted at the top of foundation 18 and embedded in cast flowable refractory by pouring the cast flowable refractory around the selected bottom mesh or wire assemblage so that the mesh or wire assemblage is embedded within the refractory after it sets as shown in FIG. 15(*b*). Alternatively the bottom mesh or wire assemblage can be cast in refractory 28 in a separate mold and then the cast refractory embedded bottom mesh or wire assemblage can be installed in the bottom of the furnace after the cast flowable refractory sets.

A suitable temporary cast flowable refractory mold 90 (or molds forming a formwork) for example, in the shape of an open right cylinder, is positioned within the volume formed by coil 16 and refractory material 20 to form a wire assemblage refractory annular volume between refractory material 20 and the outer wall perimeter of the mold as shown in FIG. 15(*c*). Electrically conductive wire assemblage 27, for example as shown in FIG. 11(*a*), is fitted around the outer perimeter of temporary mold 90 and the wire assemblage refractory 23, such as INDUCTOCOAT™ 35AF-FLOW (available from Inductotherm Corp., Rancocas, New Jersey), can be provided into the wire assemblage refractory annular volume to set and form hardened wire assemblage refractory 23 as shown in FIG. 15(*f*).

Alternatively for the electrically conductive wire assemblage 35 shown in FIG. 12(*a*) top fitting 51 is positioned at the top of temporary mold 90 in FIG. 15(*d*). A bottom fitting 52 is positioned at the bottom of temporary mold 90 and continuous electrically conductive wire 35 is weaved vertically around the outer circumference of the temporary mold in this example of the invention by using the top and bottom fittings as further illustrated in FIG. 12(*d*) which temporary fittings are removed after wire 35 is weaved.

An alternative method of forming the electrically conductive wire assemblage 27 in FIG. 11(*a*) is to weave continuous electrically conductive wire 35 shown in FIG. 12(*a*) vertically around the outer circumference of temporary mold 90 as described in the previous paragraph and then cut off all the top loops 35*a* and bottom loops 35*b* shown in FIG. 12(*a*) of the continuous electrically conductive wire to form the protective riser wires $27_1$ to $27_{26}$ in FIG. 11(*a*); then connect the riser wires together, for example, at the bottom of the furnace to form collector wire 29 to form the electrically conductive wire assemblage 27 shown in FIG. 11(*a*).

Vibrating compactors can be used to release trapped air and excess water from a cast flowable refractory (if used) so that the refractory settles firmly in place in the formwork before setting. Electrically conductive wire assemblage 27 or 35 will be at least partially embedded in wire assemblage refractory 23 when it sets inside of the wire assemblage refractory annular volume.

Figure 16:
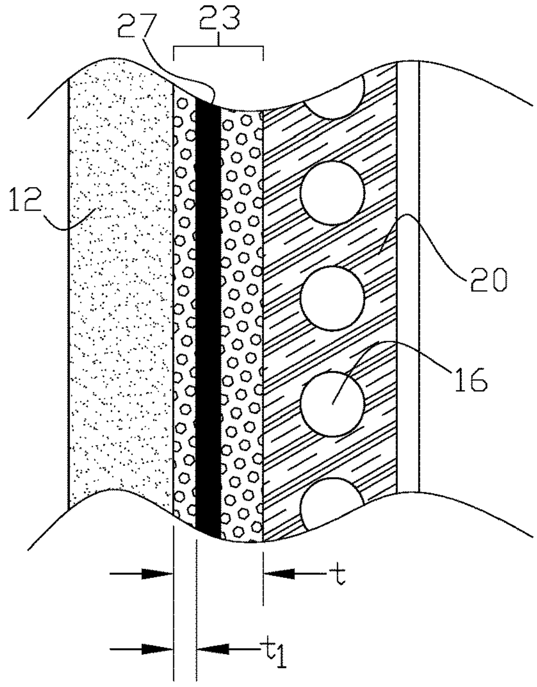
FIG. 16 is a detail of one example of the electrically conductive wire assemblage embedded in a refractory used in an electric induction furnace with a lining wear detection system of the present invention.

In other examples of the invention electrically conductive wire assemblage 27 or 35 can be embedded anywhere within the thickness, t, of cast flowable refractory 24. For example as shown in FIG. 16, electrically conductive wire assemblage 27 is offset by distance, $t_1$, from the inner wall perimeter of wire assemblage refractory 23. Offset embedment can be achieved by installing suitable standoffs 91 around the outer perimeter of mold 90 as shown in FIG. 15(*e*) and then fitting electrically conductive wire assemblage 27 around the standoffs before providing the wire assemblage refractory. In the broadest sense as used herein, the terminology mesh or wire assemblage "embedded" in a refractory means the mesh or wire assemblage is either fixed within the refractory; at a surface boundary of the refractory, or sufficiently, but not completely, embedded at a surface boundary of the refractory so that the mesh or wire assemblage is retained in place in the refractory after the refractory sets.

After wire assemblage refractory 23 sets, temporary mold 90 is removed, and a replaceable lining mold 92 that is shaped to conform to the boundary wall and bottom of interior furnace volume 14 can be positioned within the volume formed by set wire assemblage refractory 23 (with embedded wire assemblage 27) to form a replaceable lining annular volume between set cast flowable refractory 23 and the outer wall perimeter of the lining mold 92 as shown in FIG. 15(*g*). A conventional powdered refractory can then be fed into the lining volume according to conventional procedures. If lining mold 92 is formed from an electrically conductive mold material, lining mold 92 can be heated and melted in place according to conventional procedures to sinter the lining refractory layer that forms the boundary of furnace volume 14. Alternatively the lining mold may be removed and sintering of the lining refractory layer may be accomplished by direct heat application.

Distinction is made between the replaceable lining refractory, which is typically a powdered refractory and the cast flowable refractory in which the electrically conductive mesh or wire assemblage is embedded. The cast flowable refractory is used so that the electrically conductive mesh or wire assemblage can be embedded in the refractory. The cast flowable refractory is also referred to herein as castable refractory and flowable refractory.

FIG. 15(*h*) illustrates an electric induction furnace with one example of a lining wear detection system of the present invention with side wire assemblage 27 addition of typical furnace ground leak detector system probe wires 22*a* and electrical ground lead 22*b* that is connected to a furnace electrical ground (GND).

The fabrication processes described above and as shown in FIG. 15(*a*) through FIG. 15(*h*) illustrate non-limiting examples of fabrication steps exemplary to the present invention. Additional conventional fabrication steps may be required to complete furnace construction.

In alternative examples of the invention rather than using a separate trowelable refractory (grout) around coil 16, cast flowable refractory 24 can be extended to, and around coil 16.

The induction furnace of the present invention may be of any type, for example, a bottom pour, top tilt pour, pressure pour, or push-out electric induction furnace, operating at atmosphere or in a controlled environment such as an inert gas or vacuum. While the induction furnace shown in the figures has a circular interior cross section, furnaces with other cross sectional shapes, such as square, may also utilize the present invention. While a single induction coil is shown in the drawing for the electric induction furnace of the present invention, the term "induction coil" as used herein also includes a plurality of induction coils either with individual electrical connections and/or electrically interconnected induction coils.

Further the lining wear detection system of the present invention may also be utilized in portable refractory lined ladles used to transfer molten metals between locations and stationary refractory lined launders.

The examples of the invention include reference to specific electrical components. One skilled in the art may practice the invention by substituting components that are not necessarily of the same type but will create the desired conditions or accomplish the desired results of the invention. For example, single components may be substituted for multiple components or vice versa.

The invention claimed is:

1. An electric induction furnace with a lining wear detection system comprising:

a replaceable lining having an inner boundary surface and an outer boundary surface, the inner boundary surface of the replaceable lining forming an interior volume of the electric induction furnace;

an induction coil at least partially surrounding an exterior height of the replaceable lining, the induction coil disposed within a coil refractory material;

a furnace ground circuit having at a first circuit end a ground probe protruding into the interior volume of the electric induction furnace and a second circuit end terminating at an electrical ground connection external to the electric induction furnace;

at least one electrically conductive wire assemblage embedded within a wire assemblage refractory disposed between the outer boundary surface of a wall of the replaceable lining and the coil refractory material, the at least one electrically conductive wire assemblage forming an electrically discontinuous wire assemblage boundary between the wire assemblage refractory in which the at least one electrically conductive wire assemblage is embedded and the replaceable lining; and a direct current voltage source having a positive electric potential connected to one of the at least one electrically conductive wire assemblage, and a negative electric potential connected to the electrical ground connection, a wall lining wear detection circuit formed between the positive electric potential connected to the one of the at least one electrically conductive wire assemblage, and the negative electric potential connected to the electrical ground connection;

whereby electrical energy is transferred between the furnace ground circuit and the wall lining wear detection circuit causing a wall DC leakage current level in the wall lining wear detection circuit to change as the wall of the replaceable lining is consumed and electrical resistance between the furnace ground circuit and the wall lining wear detection circuit decreases;

at least one electrically conductive bottom mesh or wire assemblage embedded within a castable refractory disposed below the outer boundary surface of a bottom of the replaceable lining; and a bottom lining wear direct current voltage source having a bottom lining wear positive electric potential connected to the at least one electrically conductive bottom mesh or wire assemblage and a bottom lining wear negative electric potential connected to the electrical ground connection, a bottom lining wear detection circuit formed between the bottom lining wear positive electric potential connected to the at least one electrically conductive mesh or wire assemblage, and the bottom lining wear negative electric potential connected to the electrical ground connection;

whereby electrical energy is transferred between the furnace ground circuit and the bottom lining wear detection circuit causing the level of a bottom lining DC leakage current in the bottom lining wear detection circuit to change as the bottom of the replaceable lining is consumed and electrical resistance between the furnace ground circuit and the bottom lining wear detection circuit decreases.

2. The electric induction furnace with the lining wear detection system of claim 1 further comprising at least one lining wear detector connected to the wall lining wear detection circuit for each one of the at least one electrically conductive wire assemblage for detecting the change of the wall DC leakage current level.

3. The electric induction furnace with the lining wear detection system of claim 2 wherein the at least one lining wear detector comprises a single detector for the bottom lining wear detection circuit for each one of the at least one electrically conductive wire assemblage, the electric induction furnace with the lining wear detection system further comprising a switching device for switchably connecting the single detector among all of the lining wear detection circuits.

4. The electric induction furnace with the lining wear detection system of claim 2 wherein the at least one lining wear detector comprises a separate detector for the bottom lining wear detection circuit for each one of the at least one electrically conductive wire assemblage.

5. The electric induction furnace with the lining wear detection system of claim 1 wherein the at least one electrically conductive wire assemblage comprises a plurality of spaced apart electrically conductive riser wires electrically joined together by a connector wire, each of the plurality of spaced apart electrically conductive riser wires defining at least one free end.

6. The electric induction furnace with the lining wear detection system of claim 1 wherein the at least one electrically conductive wire assemblage comprises a continuous electrically conductive riser wire weaved around the circumference of the electric induction furnace, the continuous electrically conductive riser wire turning 180-degrees at a top and a bottom of the wire assemblage refractory defining parallel riser wire segments between each turn.

7. The electric induction furnace with the lining wear detection system of claim 1 wherein the at least one electrically conductive wire assemblage comprises an array of electrically conductive wire assemblage surrounding the height of the replaceable lining, each one of the array of electrically conductive wire assemblage electrically isolated from each other.

8. The electric induction furnace with the lining wear detection system of claim 7, wherein the at least one electrically conductive wire assemblage of the array of electrically conductive wire assemblages is oriented perpendicularly relative to at least one additional electrically conductive wire assemblage of the array of electrically conductive wire assemblages.

9. The electric induction furnace with the lining wear detection system of claim 1 further comprising at least one lining wear detector connected to the bottom lining wear detection circuit for each of the at least one electrically conductive bottom mesh or wire assemblage detecting the change in the level of the bottom lining DC leakage current.

10. The electric induction furnace with the lining wear detection system of claim 1 wherein the at least one electrically conductive bottom mesh or wire assemblage comprises a circular electrically conductive mesh or wire assemblage.

11. The electric induction furnace with the lining wear detection system of claim 1 wherein the at least one electrically conductive bottom mesh or wire assemblage comprises an array of electrically conductive bottom meshes or wire assemblages, each one of the array of electrically conductive bottom meshes or wire assemblages electrically isolated from each other.

12. The electric induction furnace with the lining wear detection system of claim 1 wherein the at least one lining wear detector comprises a single bottom lining wear detector for the bottom lining wear detection circuit for each one of the at least one electrically conductive bottom mesh or wire assemblage, the electric induction furnace with the lining wear detection system further comprising a switching device for switchably connecting the single bottom lining wear detector among all of the bottom lining wear detection circuit for each one of the at last one electrically conductive bottom mesh or wire assemblage.

13. The electric induction furnace with the lining wear detection system of claim 1 wherein the at least one lining wear detector comprises a separate bottom lining wear detector for the bottom lining wear detection circuit for each one of the at least one electrically conductive bottom mesh or wire assemblage.

14. The electric induction furnace with the lining wear detection system of claim 1, wherein the electrically conductive wire assemblage is offset from an inner wall perimeter of the wire assemblage refractory, such that the electrically conductive wire assemblage is disposed entirely within the wire assemblage refractory.

15. An electric induction furnace with a lining wear detection system comprising:

a replaceable lining having an inner boundary surface and an outer boundary surface, the inner boundary surface of the replaceable lining forming an interior volume of the electric induction furnace;

an induction coil at least partially surrounding an exterior height of the electric induction furnace in which the replaceable lining is disposed, the induction coil disposed within a coil refractory lining;

a furnace ground circuit having at a first circuit end at a ground probe protruding into the interior volume of the electric induction furnace and a second circuit end terminating at an electrical ground connection external to the electric induction furnace;

at least one electrically conductive wire assemblage embedded within a castable refractory disposed between the outer boundary surface of a wall of the replaceable lining and the coil refractory lining, the at least one electrically conductive wire assemblage forming an electrically discontinuous wire assemblage boundary between the castable refractory in which the at least one electrically conductive wire assemblage is embedded and the replaceable lining;

a direct current voltage source having a positive electric potential connected to one of the at least one the electrically conductive wire assemblage, and a negative electric potential connected to the electrical ground connection, a wall lining wear detection circuit formed between the positive electric potential connected to the one of the at least one electrically conductive wire assemblage, and the negative electric potential connected to the electrical ground connection;

whereby electrical energy is transferred between the furnace ground circuit and the wall lining wear detection circuit causing a wall DC leakage current level in the wall lining wear detection circuit to change as the wall of the replaceable lining is consumed and electrical resistance between the furnace ground circuit and the wall lining wear detection circuit decreases;

at least one electrically conductive bottom mesh or wire assemblage embedded within a bottom castable refractory disposed below a bottom outer boundary surface of a bottom of the replaceable lining, the at least one electrically conductive bottom mesh or wire assemblage forming an electrically discontinuous mesh or wire assemblage boundary below the bottom castable refractory in which the at least one electrically conductive bottom mesh or wire assemblage is embedded; and a bottom lining wear direct current voltage source having a bottom lining wear positive electric potential connected to one of the at least one electrically conductive bottom mesh or wire assemblage and a bottom lining wear negative electric potential connected to the electrical ground connection, a bottom lining wear detection circuit formed between the bottom lining wear positive electric potential connected to the one of the at least one electrically conductive bottom mesh or wire assemblage, and the bottom lining wear negative electric potential connected to the electrical ground connection;

whereby electrical energy is transferred between the furnace ground circuit and the bottom lining wear detection circuit causing the level of a bottom lining DC leakage current in the bottom lining wear detection circuit to change as the bottom of the replaceable lining is consumed and electrical resistance between the furnace ground circuit and the bottom lining wear detection circuit decreases.

16. The electric induction furnace with the lining wear detection system of claim 15 further comprising at least one bottom lining wear detector connected to the bottom lining wear detection circuit for each one of the at least one electrically conductive bottom mesh or wire assemblage for detecting a change in the bottom lining level of the bottom lining DC leakage current.

17. The electric induction furnace with the lining wear detection system of claim 15 wherein the at least one electrically conductive bottom mesh or wire assemblage comprises a circular electrically conductive mesh or wire assemblage having a radial gap between opposing radial ends.

18. The electric induction furnace with the lining wear detection system of claim 15 wherein the at least one electrically conductive bottom mesh or wire assemblage comprises a circular electrically conductive mesh or wire assemblage, the circular electrically conductive mesh or wire assemblage having an overlapping radial ends separated by a bottom mesh or wire assemblage electrical insulation.

19. The electric induction furnace with the lining wear detection system of claim 15 further comprising a single bottom lining wear detector for the bottom lining wear detection circuit for each one of the at least one electrically conductive bottom mesh or wire assemblage, the electric induction furnace with the lining wear detection system further comprising a switching device for switchably connecting the single bottom lining wear detector among the bottom lining wear detection circuit for each one of the electrically conductive lining mesh and wire assemblage.

20. The electric induction furnace with the lining wear detection system of claim 15 further comprising a separate bottom lining wear detector for the bottom lining wear detection circuit for each one of the at least one electrically conductive bottom mesh or wire assemblage.

* * * * *